United States Patent
Lee et al.

(10) Patent No.: US 12,119,441 B2
(45) Date of Patent: Oct. 15, 2024

(54) SOLID ION CONDUCTOR COMPOUND, SOLID ELECTROLYTE INCLUDING SOLID ION CONDUCTOR COMPOUND, ELECTROCHEMICAL CELL INCLUDING SOLID ION CONDUCTOR COMPOUND, AND METHOD OF PREPARING SOLID ION CONDUCTOR COMPOUND

(71) Applicant: Samsung SDI Co., Ltd., Yongin-si (KR)

(72) Inventors: Seoksoo Lee, Yongin-si (KR); Hyunseok Kim, Suwon-si (KR); Soyeon Kim, Suwon-si (KR)

(73) Assignee: SAMSUNG SDI CO., LTD., Gyeonggi-Do (KR)

( * ) Notice: Subject to any disclaimer, the term of this patent is extended or adjusted under 35 U.S.C. 154(b) by 303 days.

(21) Appl. No.: 17/083,385

(22) Filed: Oct. 29, 2020

(65) Prior Publication Data

US 2021/0135280 A1    May 6, 2021

(30) Foreign Application Priority Data

Nov. 1, 2019 (KR) .................. 10-2019-0138765
Sep. 9, 2020 (KR) .................. 10-2020-0115523

(51) Int. Cl.
*H01M 10/0562* (2010.01)
*C01B 25/14* (2006.01)
(Continued)

(52) U.S. Cl.
CPC ......... *H01M 10/0562* (2013.01); *C01B 25/14* (2013.01); *H01M 4/366* (2013.01);
(Continued)

(58) Field of Classification Search
CPC .... H01M 10/0562; H01M 4/62; H01M 4/366; H01M 10/0585; H01M 2300/0068;
(Continued)

(56) References Cited

U.S. PATENT DOCUMENTS 7,993,782 B2    8/2011   Takada et al.
8,075,865 B2   12/2011   Deiseroth et al.
(Continued)

FOREIGN PATENT DOCUMENTS

CN    108238616 A    7/2018
CN    108493479 A    9/2018
(Continued)

OTHER PUBLICATIONS

Chen Ting, Argyrodite Solid Electrolyte with a Stable Interface and Superior Dendrite Suppression Capability Realized by ZnO Co-Doping (Year: 2019).*
(Continued)

*Primary Examiner* — Brian R Ohara
(74) *Attorney, Agent, or Firm* — CANTOR COLBURN LLP

(57) ABSTRACT

A compound represented by Formula 1 and having an argyrodite-type crystal structure:

$$Li_xM1_vPS_yM2_wM3_z \quad \text{Formula 1}$$

In Formula 1, M1 is at least one metal element of Group 1 to Group 15 of the periodic table, except Li, M2 is $SO_n$, M3 is at least one element of Group 17 of the periodic table; and $4 \le x \le 8$, $0 \le v < 1$, $3 \le y \le 7$, $0 < w < 2$, $0 \le z \le 2$, and $1.5 \le n \le 5$.

26 Claims, 6 Drawing Sheets

(51) Int. Cl.
  *H01M 4/36* (2006.01)
  *H01M 4/587* (2010.01)
  *H01M 4/62* (2006.01)
  *H01M 10/0585* (2010.01)

(52) U.S. Cl.
  CPC ............ *H01M 4/587* (2013.01); *H01M 4/62* (2013.01); *H01M 10/0585* (2013.01); *C01P 2002/30* (2013.01); *C01P 2002/72* (2013.01); *C01P 2006/40* (2013.01); *H01M 2300/0068* (2013.01)

(58) Field of Classification Search
  CPC .... H01M 4/587; C01B 25/14; C01P 2002/30; C01P 2002/72; C01P 2006/40
  See application file for complete search history.

(56) References Cited

U.S. PATENT DOCUMENTS

| | | | |
|---|---|---|---|
| 9,634,358 | B2 | 4/2017 | Matsushita |
| 9,793,574 | B2 | 10/2017 | Seino et al. |
| 9,812,734 | B2 | 11/2017 | Miyashita et al. |
| 9,899,701 | B2 | 2/2018 | Miyashita et al. |
| 9,899,702 | B2 | 2/2018 | Miyashita et al. |
| 10,177,381 | B2 | 1/2019 | Fanous et al. |
| 10,879,562 | B2 | 12/2020 | Kim et al. |
| 11,264,642 | B2 | 3/2022 | Utsuno et al. |
| 2016/0293946 | A1* | 10/2016 | Ritter ................ H01M 10/0525 |
| 2017/0187066 | A1 | 6/2017 | Tsujimura et al. |
| 2018/0351148 | A1 | 12/2018 | Schneider et al. |
| 2019/0173120 | A1 | 6/2019 | Rupert et al. |
| 2019/0319259 | A1* | 10/2019 | Balogh ................ H01M 4/0471 |
| 2020/0087155 | A1* | 3/2020 | Rupert ................ H01M 4/131 |
| 2020/0194827 | A1 | 6/2020 | Seong et al. |
| 2020/0381772 | A1* | 12/2020 | Kim ................ H01M 10/0562 |
| 2021/0094821 | A1 | 4/2021 | Black et al. |
| 2021/0135278 | A1 | 5/2021 | Kim et al. |

FOREIGN PATENT DOCUMENTS

| | | |
|---|---|---|
| CN | 108630914 A | 10/2018 |
| CN | 109526242 A | 3/2019 |
| KR | 101952196 B1 | 2/2019 |

OTHER PUBLICATIONS

Chen et al. "Stability and ionic mobility in argyrodite-related lithium-ion solid electrolytes", Phys. Chem. Chem. Phys., 17, 2017, 16494.

Extended European search report issued Mar. 29, 2021 of EP Patent Application No. 20204578.7.

R.B. Beeken et al., "Electrical conductivities of the Ag6PS5X and the Cu6PSe5X (X=Br, I) argyrodites," Journal of Physics and Chemistry of Solids, 2005, pp. 882-886, vol. 66.

S.Fiechter et al., "Thermochemical data of argyrodite-type ionic conductors: Cu6PS5Hal (Hal=Cl, Br, I)," Thermochimica Acta, Apr. 1, 1985, pp. 155-158, vol. 85.

OA issued Nov. 15, 2023 of CN Patent Application No. 202011180766.4.

Office Action issued Jan. 11, 2024 of EP Patent Application No. 20204578.7.

* cited by examiner

SOLID ION CONDUCTOR COMPOUND, SOLID ELECTROLYTE INCLUDING SOLID ION CONDUCTOR COMPOUND, ELECTROCHEMICAL CELL INCLUDING SOLID ION CONDUCTOR COMPOUND, AND METHOD OF PREPARING SOLID ION CONDUCTOR COMPOUND

CROSS-REFERENCE TO RELATED APPLICATION

This application claims priority to and the benefit of Korean Patent Application No. 10-2019-0138765, filed on Nov. 1, 2019, in the Korean Intellectual Property Office, and Korean Patent Application No. 10-2020-0115523, filed on Sep. 9, 2020, in the Korean Intellectual Property Office, and all the benefits accruing therefrom under 35 U.S.C. § 119, the contents of which in their entirety are incorporated herein by reference.

BACKGROUND

1. Field

The present disclosure relates to a solid ion conductor, a solid electrolyte including the solid ion conductor, a lithium battery including the solid ion conductor, and a method of preparing the solid ion conductor.

2. Description of Related Art

All-solid lithium batteries include a solid electrolyte. The all-solid batteries can avoid the use of a flammable organic solvent and thus can provide improved safety and stability.

Solid electrolyte materials are not sufficiently stable with respect to lithium metal. Also, a lithium ion conductivity of the solid electrolyte is lower than that of a liquid alternative. Thus, there remains a need for an improved solid electrolyte.

SUMMARY

Provided is a compound having improved lithium ion conductivity, oxidative stability, and atmospheric stability in the solid state.

Provided is a solid electrolyte including the compound.

Provided is an electrochemical cell including the solid ion conductor compound.

Provided are methods of preparing the solid ion conductor compound.

Additional aspects will be set forth in part in the description which follows and, in part, will be apparent from the description.

According to an aspect of an embodiment, the disclosed is a compound represented by Formula 1 and having an argyrodite-type crystal structure:

$$Li_xM1_vPS_yM2_wM3_z \qquad \text{Formula 1}$$

wherein, in Formula 1,

M1 is at least one metal element of Group 1 to Group 15 of the periodic table, except Li, M2 is $SO_n$;

M3 is at least one element of Group 17 of the periodic table, and $4 \leq x \leq 8$, $0 \leq v < 1$, $3 \leq y \leq 7$, $0 < w < 2$, $0 \leq z \leq 2$, and $1.5 \leq n \leq 5$.

According to an aspect of another embodiment, a solid electrolyte includes a layer comprising the compound.

According to an aspect of another embodiment, an electrochemical cell includes a cathode layer including a cathode active material layer;

an anode layer including an anode active material layer; and an electrolyte layer disposed between the cathode layer and the anode layer, wherein at least one of the cathode active material layer and the electrolyte layer include the compound.

According to an aspect of another embodiment, a method of preparing a solid ion conductor compound includes:

contacting a compound including lithium, a compound including a metal element of Group 1 to Group 15 of the periodic table, except Li, a compound including P, a compound including $SO_n$ wherein $1.5 \leq n \leq 5$, and optionally a compound including a Group 17 element of the periodic table to prepare a mixture; and heat-treating the mixture in an inert atmosphere to prepare the compound.

Also disclosed is a protected cathode active material including: a lithium transition metal oxide, a transition metal sulfide, a lithium transition metal sulfide or a combination thereof; and the compound on surface of the lithium transition metal oxide, the lithium transition metal sulfide or the transition metal sulfide.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
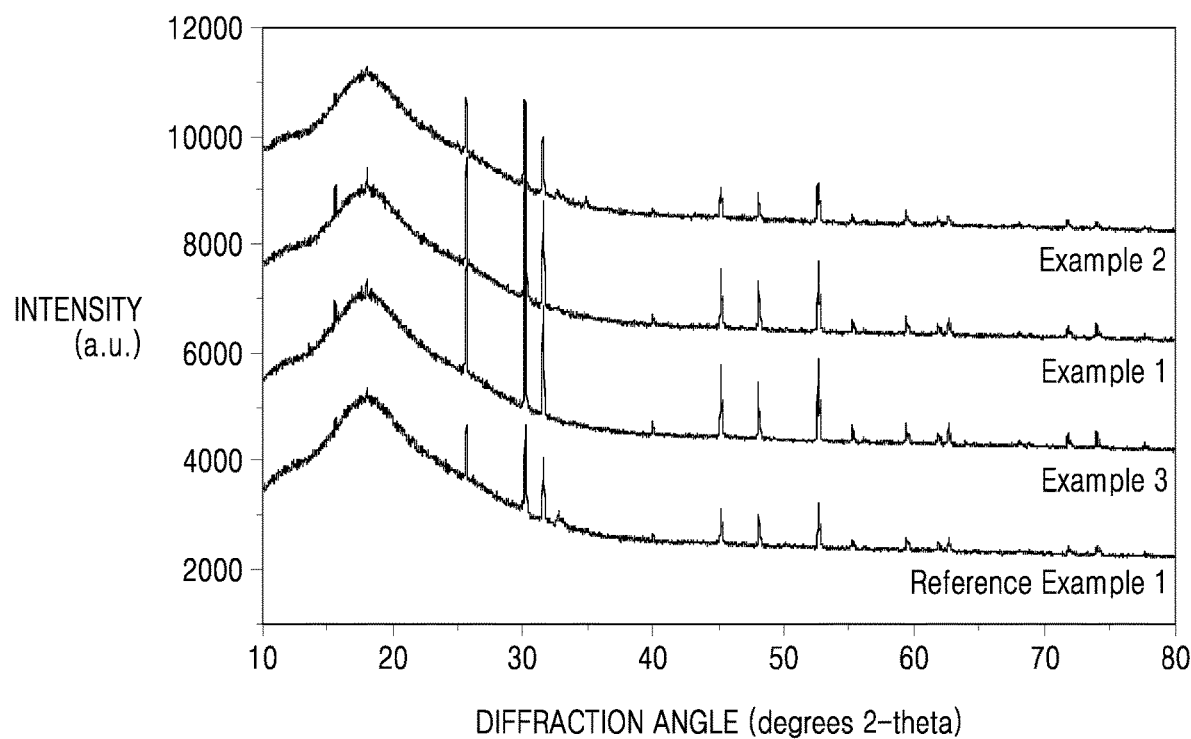
FIG. 1A is a graph of intensity (arbitrary units, a.u.) versus diffraction angle (degrees 2θ) which shows the results of powder X-ray diffraction (XRD) analysis of solid ion conductor compounds prepared in Examples 1 to 3 and Reference Example 1.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

Various example embodiments are described herein more fully with reference to the accompanying drawings. This inventive concept may, however, be embodied in many different forms and should not be construed as limited to the exemplary embodiments set forth herein. Rather, these embodiments are provided so that this disclosure will be thorough and complete, and will fully convey the scope of the inventive concept to one of ordinary skill in the art. Like reference numerals in the drawings denote like elements.

It will be understood that when a component is referred to as being "on" another component, the component can be directly on the other component or intervening components may be present therebetween. In contrast, when a component is referred to as being "directly on" another component, an intervening component is not present therebetween.

While such terms as "first," "second," "third", etc., may be used to describe various elements, components, regions, layers, and/or sections, such elements, components, regions, layers, and/or sections must not be limited to the above terms. The above terms are used only to distinguish one element, component, region, layer, or section from another element, component, region, layer, or section. Therefore, a first element, component, region, layer, or section described hereinafter may be referred to as a second element, component, region, layer, or section without departing from the teachings of the present specification.

The terms used in the present specification are merely used to describe particular embodiments, and are not intended to limit the inventive concept. As used herein, "a," "an," "the," and "at least one" do not denote a limitation of quantity, and are intended to cover both the singular and plural, unless the context clearly indicates otherwise. For example, "an element" has the same meaning as "at least one element," unless the context clearly indicates otherwise. Expressions such as "at least one of," when preceding a list of elements, modify the entire list of elements and do not modify the individual elements of the list. As used herein, the term "and/or" includes any and all combinations of one or more of the associated list items. It will be further understood that the terms "includes," "comprises," "including," and/or "comprising," when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Spatially relative terms, such as "bottom", "below", "lower", "under", "above", "top", and "upper", may be used herein for ease of description to describe one element or feature's relationship to another element(s) or feature(s) as illustrated in the figures.

It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations), and the spatially relative descriptors used herein may be interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments are described herein with reference to cross-sectional illustrations that are schematic illustrations of idealized example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, a region illustrated or described as flat may, typically, have rough and/or nonlinear features. Moreover, angles illustrated as sharp may be rounded. Thus, the regions illustrated in the figures are schematic in nature and their shapes are not intended to illustrate the actual shape of a region and are not intended to limit the scope of the present description.

As used herein, the term "Group" refers to a group of the periodic table of the elements according to the International Union of Pure and Applied Chemistry ("IUPAC") 1-18 group classification system.

While particular embodiments are described, alternatives, modifications, variations, improvements, and substantial equivalents that are or may be presently unforeseen or unexpected may arise to applicants or those skilled in the art. Accordingly, the appended claims as filed and as they may be amended are intended to embrace all such alternatives, modification, variations, improvements, and substantial equivalents.

"Argyrodite," "argyrodite structure," or "argyrodite-type structure" as used herein means that the compound has a crystal structure that is isostructural with argyrodite, $Ag_8GeS_6$. As used herein, the term "metal element" includes both a metal and a metalloid.

Hereinafter, according to one or more embodiments, a solid ion conductor compound, a solid electrolyte including the solid ion conductor compound; an electrochemical cell including the solid ion conductor compound, and a method of preparing the solid ion conductor compound will be described in detail.

Solid Ion Conductor Compound

Disclosed is a compound having ion conducting properties, i.e., a solid ion conductor compound. The solid ion conductor compound according to an embodiment is represented by Formula 1 and has an argyrodite-type crystal structure:

$$Li_xM1_vPS_yM2_wM3_z \qquad \text{Formula 1}$$

In Formula 1, M1 is at least one metal element of Group 1 to Group 15 of the periodic table, except Li; M2 is $SO_n$; M3 is at least one element of Group 17 of the periodic table; and $4 \le x \le 8$, $0 \le v < 1$, $3 \le y \le 7$, $0 < w < 2$, $0 \le z \le 2$, and $1.5 \le n \le 5$. For example, $5 \le x \le 8$, $0 \le v < 1$, $4 \le y \le 7$, $0 < w < 2$, $0 \le z \le 2$, and $1.5 \le n \le 5$, or $5 < x < 8$, $0 < v < 1$, $4 < y < 7$, $0 < w < 2$, $0 < z < 2$, and $1.5 < n < 5$. For example, $5 \le x \le 7$, $0 \le v < 1$, $4 \le y \le 6$, $0 < w < 2$, $0 \le z \le 2$, and $1.5 \le n \le 5$. For example, $5.4 \le x \le 7$, $0 \le v < 1$, $4.5 \le y \le 6$, $0 < w < 2$, $0.2 \le z \le 1.8$, and $1.5 \le n \le 5$, or $5.4 < x < 7$, $0 < v < 1$, $4.5 < y < 6$, $0 < w < 2$, $0.2 < z < 1.8$, and $1.5 < n < 5$.

The compound represented by Formula 1 may be a crystalline compound having an argyrodite-type crystal structure, and the compound may have an improved ion conductivity of lithium ions and a decreased activation energy due to the inclusion of $SO_4$ substituted on some of sulfur (S) sites in the crystal structure. In an aspect, and while not wanting to be bound by theory, it is understood that a crystal lattice volume may increase since ions having an ionic radius larger than that of sulfur ions are placed in some of the sulfur sites in the solid ion conductor compound represented by Formula 1. When the crystal lattice volume increases, the migration of lithium ions in the crystal lattice may be facilitated. Also, when $SO_4$, which includes an oxygen atom, of which oxidative stability and/or atmospheric stability are greater relative than that of a sulfur atom, is placed in some sulfur (S) sites in the solid ion conductor compound represented by Formula 1, the structural stability of the compound may improve.

Also, when the compound represented by Formula 1 includes a metal or metalloid substituted in some lithium sites in the crystal structure, the compound may have an improved ion conductivity of lithium ions and a decreased activation energy. For example, and while not wanting to be bound by theory, it is understood that a crystal lattice volume may increase since ions having an ion radius larger than that of lithium ions while having an oxidation number same with that of lithium are placed in some of the lithium sites in the solid ion conductor compound represented by Formula 1. When the crystal lattice volume increases, the migration of lithium ions in the crystal lattice may be facilitated. For example, when ions having an oxidation number of at least 2, which is greater than an oxidation number of a lithium ion, are placed in lithium sites in the solid ion conductor compound represented by Formula 1, some lithium sites may be vacant sites, e.g., for charge neutrality. When there are vacant sites in the crystal lattice, the migration of lithium ions in the crystal lattice may be facilitated.

In the solid ion conductor compound represented by Formula 1, for example, v, w, x, and y may satisfy $0 \leq v/(x+v) < 0.2$ and $0 < w/(y+w) < 0.2$; $0 \leq v/(x+v) < 0.15$ and $0 < w/(y+w) < 0.15$; or $0 \leq v/(x+v) < 0.1$ and $0 < w/(y+w) < 0.1$.

In the solid ion conductor compound represented by Formula 1, for example, v, w, x, y and z may satisfy $0 \leq v/(x+v) < 0.2$ and $0 < w/(y+w+z) < 0.2$; $0 \leq v/(x+v) < 0.15$ and $0 < w/(y+w+z) < 0.15$; or $0 \leq v/(x+v) < 0.1$ and $0 < w/(y+w+z) < 0.1$.

In the solid ion conductor compound represented by Formula 1, for example, $SO_n$ may be $S_4O_6$, $S_3O_6$, $S_2O_3$, $S_2O_4$, $S_2O_5$, $S_2O_6$, $S_2O_7$, $S_2O_8$, $SO_4$, $SO_5$, or a combination thereof. $SO_n$ may be, for example, a monovalent anion or a divalent anion. $SO_n^{2-}$ may be, for example $S_4O_6^{2-}$, $S_3O_6^{2-}$, $S_2O_3^{2-}$, $S_2O_4^{2-}$, $S_2O_5^{2-}$, $S_2O_6^{2-}$, $S_2O_7^{2-}$, $S_2O_8^{2-}$, $SO_4^{2-}$, $SO_5^{2-}$, or a combination thereof.

In the solid ion conductor compound represented by Formula 1, for example, v, w, x, and y may satisfy $0 \leq v/(x+v) < 0.08$ and $0 < w/(y+w) < 0.08$, and the compound may include $SO_4$.

In the solid ion conductor compound represented by Formula 1, for example, v, w, x, y and z may satisfy $0 \leq v/(x+v) < 0.08$ and $0 < w/(y+w+z) < 0.08$, and the compound may include $SO_4$.

In the solid ion conductor compound represented by Formula 1, for example, M1 may include Na, K, Mg, Ag, Cu, Hf, In, Ti, Pb, Sb, Fe, Zr, Zn, Cr, B, Sn, Ge, Si, Ta, Nb, V, Ga, Al, As, or a combination thereof.

In the solid ion conductor compound represented by Formula 1, for example, M1 may include Na, K, Mg, Ag, Cu, or a combination thereof.

In the solid ion conductor compound represented by Formula 1, for example, M3 may include F, Cl, Br, I, or a combination thereof.

The solid ion conductor compound represented by Formula 1 may be, for example, a solid ion conductor compound represented by Formula 2:

$$Li_{7-m \times v-z}M1_vPS_{6-w-z}M2_wM3_z \quad \text{Formula 2}$$

In Formula 2, M1 is at least one metal element of Groups 1 to 15 of the periodic table, except Li; m is an oxidation number of M1; M2 is $SO_n$; M3 is an element of Group 17 of the periodic table; and $0 \leq v < 1$, $0 < w < 2$, $0 \leq z \leq 2$, $1.5 \leq n \leq 5$, and $1 \leq m \leq 2$. For example, m is 1 or 2.

An appropriate monovalent cation of Groups 1 to 11 of the periodic table may be, for example, Na, K, Rb, Cs, Cu, or Ag.

The solid ion conductor compound represented by Formula 1 may be, for example, a solid ion conductor compound represented by at least one of Formula 3 or Formula 4:

$$(Li_{1-d}M1_d)_aP(S_{1-e}M2_e)_bM3_c \quad \text{Formula 3}$$

$$(Li_{1-d}M1_d)_aLi_{fc}P(S_{1+fc-e}M2_e)_b(M3_{1-f}M2_f)_c \quad \text{Formula 4}$$

In Formula 3 and Formula 4, M1 is Na, K, Mg, Ag, Cu, Hf, In, Ti, Pb, Sb, Fe, Zr, Zn, Cr, B, Sn, Ge, Si, Ta, Nb, V, Ga, Al, As, or a combination thereof; M2 is $SO_4$; M3 is at least one an element of Group 17 of the periodic table; $5 \leq a \leq 7$, $4 \leq b \leq 6$, and $0 \leq c \leq 2$; and $0 < d \leq 0.08$, $0 < e \leq 0.08$, $0 < f \leq 0.08$, and $0 < e+f \leq 0.08$. In an aspect, the solid ion conductor compound is one of Formula 3 or Formula 4. In an aspect, M3 is a single element of Group 17.

In the solid ion conductor compound represented by Formula 4, for example, some chlorine atoms may be precipitated as LiCl due to substitution of M2 in the S sites.

The solid ion conductor compound represented by Formula 1 may be, for example, a solid ion conductor compound represented by at least one of Formula 5 or Formula 6.

$$(Li_{1-d}M1_d)_aP(S_{1-e}(SO_4)_e)_bM3_c \quad \text{Formula 5}$$

$$(Li_{1-d}M1_d)_aLi_{fc}P(S_{1+fc-e}(SO_4)_e)_b(M3_{1-f}(SO_4)_f)_c \quad \text{Formula 6}$$

In Formula 5 and Formula 6, M1 is Na, K, Mg, Ag, Cu, or a combination thereof; M3 is at least one element of Group 17 of the periodic table; $5 \leq a \leq 7$, $4 \leq b \leq 6$, and $0 \leq c \leq 2$; and $0 < d < 0.08$, $0 < e < 0.08$, $0 < f < 0.08$, and $0 < e+f < 0.08$. In an aspect, M3 is a single element of Group 17.

In the solid ion conductor compound represented by Formula 6, for example, some chlorine atoms may be precipitated as LiCl due to substitution of $SO_4$ in the S sites.

The solid ion conductor compound represented by Formula 1 may be, for example, a solid ion conductor compound represented by at least one of Formula 5a to Formula 6e:

$$(Li_{1-d}Na_d)_aP(S_{1-e}(SO_4)_e)_bM3_c \quad \text{Formula 5a}$$

$$(Li_{1-d}K_d)_aP(S_{1-e}(SO_4)_e)_bM3_c \quad \text{Formula 5b}$$

$$(Li_{1-d}Mg_d)_aP(S_{1-e}(SO_4)_e)_bM3_c \quad \text{Formula 5c}$$

$$(Li_{1-d}Ag_d)_aP(S_{1-e}(SO_4)_e)_bM3_c \quad \text{Formula 5d}$$

$$(Li_{1-d}Cu_d)_aP(S_{1-e}(SO_4)_e)_bM3_c \quad \text{Formula 5e}$$

$$(Li_{1-d}Na_d)_aLi_{fc}P(S_{1+fc-e}(SO_4)_e)b(M3_{1-f}(SO_4)_f)_c \quad \text{Formula 6a}$$

$$(Li_{1-d}K_d)_aLi_{fc}P(S_{1+fc-e}(SO_4)_e)_b(M3_{1-f}(SO_4)_f)_c \quad \text{Formula 6b}$$

$$(Li_{1-d}Mg_d)_aLi_{fc}P(S_{1+fc-e}(SO_4)_e)_b(M3_{1-f}(SO_4)_f)_c \quad \text{Formula 6c}$$

$$(Li_{1-d}Ag_d)_aLi_{fc}P(S_{1-e}(SO_4)_e)_b(M3_{1-f}(SO_4)_f)_c \quad \text{Formula 6d}$$

$$(Li_{1-d}Cu_d)_aLi_{fc}P(S_{1+fc-e}(SO_4)_e)_b(M3_{1-f}(SO_4)_f)_c \quad \text{Formula 6e}$$

In Formula 5a to Formula 6e, M3 is at least one element of Group 17 of the periodic table; $5 \leq a \leq 7$, $4 \leq b \leq 6$, and $0 \leq c \leq 2$;

and $0<d\leq0.06$, $0<e\leq0.06$, $0<f\leq0.06$, and $0<e+f\leq0.06$. In an aspect, M3 is a single element of Group 17.

In the solid ion conductor compound represented by one of Formulae 6a to 6e, for example, some chlorine atoms may be precipitated as LiCl due to substitution of $SO_4$ in the S sites.

The solid ion conductor compound represented by Formula 1 may be, for example, a solid ion conductor compound represented by at least one of:

$(Li_{1-d}Cu_d)_aP(S_{1-e}(SO_4)_e)_bF_c$, $(Li_{1-d}Cu_d)_aP(S_{1-e}(SO_4)_e)_b$ Cl, $(Li_{1-d}Cu_d)_aP(S_{1-e}(SO_4)_e)_bBr_c$, $(Li_{1-d}Cu_d)_aP(S_{1-e}(SO_4)_e)_bI_c$, $(Li_{1-d}Cu_d)_aLi_{fc}P(S_{1+fc-e}(SO_4)_e)_b(F_{1-f}(SO_4)_f)_c$, $(Li_{1-d}Cu_d)_aLi_{fc}P(S_{1+fc-e}(SO_4)_e)_b(Cl_{1-f}(SO_4)_f)_c$, $(Li_{1-d}Cu_d)_aLi_{fc}P(S_{1+fc-e}(SO_4)_e)_b(Br_{1-f}(SO_4)_f)_c$, $(Li_{1-d}Cu_d)_aLi_{fc}P(S_{1+fc-e}(SO_4)_e)_b(I_{1-f}(SO_4)_f)_c$, $(Li_{1-d}Na_d)_aP(S_{1-e}(SO_4)_e)_bF_c$, $(Li_{1-d}Na_d)_aP(S_{1-e}(SO_4)_e)_b$ Cl, $(Li_{1-d}Na_d)_aP(S_{1-e}(SO_4)_e)_bBr_c$, $(Li_{1-d}Na_d)_aP(S_{1-e}(SO_4)_e)_bI_c$, $(Li_{1-d}Na_d)_aLi_{fc}P(S_{1+fc-e}(SO_4)_e)_b(F_{1-f}(SO_4)_f)_c$, $(Li_{1-d}Na_d)_aLi_{fc}P(S_{1+fc-e}(SO_4)_e)_b(Cl_{1-f}(SO_4)_f)_c$, $(Li_{1-d}Na_d)_aLi_{fc}P(S_{1+fc-e}(SO_4)_e)_b(Br_{1-f}(SO_4)_f)_c$, $(Li_{1-d}Na_d)_aLi_{fc}P(S_{1+fc-e}(SO_4)_e)_b(I_{1-f}(SO_4)_f)_c$, $(Li_{1-d}K_d)_aP(S_{1-e}(SO_4)_e)_bF_c$, $(Li_{1-d}K_d)_aP(S_{1-e}(SO_4)_e)_bCl_c$, $(Li_{1-d}K_d)_aP(S_{1-e}(SO_4)_e)_bBr_c$, $(Li_{1-d}K_d)_aP(S_{1-e}(SO_4)_e)_bI_c$, $(Li_{1-d}K_d)_aLi_{fc}P(S_{1+fc-e}(SO_4)_e)_b(F_{1-f}(SO_4)_f)_c$, $(Li_{1-d}K_d)_aLi_{fc}P(S_{1+fc-e}(SO_4)_e)_b(Cl_{1-f}(SO_4)_f)_c$, $(Li_{1-d}K_d)_aLi_{fc}P(S_{1+fc-e}(SO_4)_e)_b(Br_{1-f}(SO_4)_f)_c$, $(Li_{1-d}K_d)_aLi_{fc}P(S_{1+fc-e}(SO_4)_e)_b(I_{1-f}(SO_4)_f)_c$, $(Li_{1-d}Mg_d)_aP(S_{1-e}(SO_4)_e)_bF_c$, $(Li_{1-d}Mg_d)_aP(S_{1-e}(SO_4)_e)_b$ Cl, $(Li_{1-d}Mg_d)_aP(S_{1-e}(SO_4)_e)_bBr_c$, $(Li_{1-d}Mg_d)_aP(S_{1-e}(SO_4)_e)_bI_c$, $(Li_{1-d}Mg_d)_aLi_{fc}P(S_{1+fc-e}(SO_4)_e)_b(F_{1-f}(SO_4)_f)_c$, $(Li_{1-d}Mg_d)_aLi_{fc}P(S_{1+fc-e}(SO_4)_e)_b(Cl_{1-f}(SO_4)_f)_c$, $(Li_{1-d}Mg_d)_aLi_{fc}P(S_{1+fc-e}(SO_4)_e)_b(Br_{1-f}(SO_4)_f)_c$, $(Li_{1-d}Mg_d)_aLi_{fc}P(S_{1+fc-e}(SO_4)_e)_b(I_{1-f}(SO_4)_f)_c$, $(Li_{1-d}Ag_d)_aP(S_{1-e}(SO_4)_e)_bF_c$, $(Li_{1-d}Ag_d)_aP(S_{1-e}(SO_4)_e)_bCl_c$, $(Li_{1-d}Ag_d)_aP(S_{1-e}(SO_4)_e)_bBr_c$, $(Li_{1-d}Ag_d)_aP(S_{1-e}(SO_4)_e)_bI_c$, $(Li_{1-d}Ag_d)_aLi_{fc}P(S_{1+fc-e}(SO_4)_e)_b(F_{1-f}(SO_4)_f)_c$, $(Li_{1-d}Ag_d)_aLi_{fc}P(S_{1+fc-e}(SO_4)_e)_b(Cl_{1-f}(SO_4)_f)_c$, $(Li_{1-d}Ag_d)_aLi_{fc}P(S_{1+fc-e}(SO_4)_e)_b(Br_{1-f}(SO_4)_f)_c$, or $(Li_{1-d}Ag_d)_aLi_{fc}P(S_{1+fc-e}(SO_4)_e)_b(I_{1-f}(SO_4)_f)_c$.

A combination comprising at least two of the foregoing may be used.

In the formulae above, each a, b, c, d, e, and f may be independently selected, and $5\leq a\leq7$, $4\leq b\leq6$, and $0\leq c\leq2$; and $0<d\leq0.06$, $0<e<0.06$, $0<f<0.06$, and $0<e+f<0.06$.

The solid ion conductor compound represented by Formula 1 may be, for example, a solid ion conductor compound represented by Formula 7:

$$Li_{7-pxv-u-z}M4_vM5_uPS_{6-w-z}M2_wM3_z \quad \text{Formula 7}$$

In Formula 7, M4 is a metal element of Groups 2 to 15 of the periodic table; p is an oxidation number of M4, M2 is $SO_n$; M3 is an element of Group 17 of the periodic table; M5 is a metal element of Group 1 of the periodic table, except Li, and is a monovalent cation; and $0\leq v<1$, $0\leq u<1$, $0<w<2$, $0\leq z\leq2$, $1.5\leq n\leq5$, and $1\leq p\leq2$. For example, p is 1 or 2. In an aspect, M4 is at least one element of Groups 2 to 15. In an aspect, M3 is at least one element of Group 17.

In the solid ion conductor compound represented by Formula 7, for example, M4 may include Cu, Ag, Mg, Hf, In, Ti, Pb, Sb, Fe, Zr, Zn, Cr, B, Sn, Ge, Si, Ta, Nb, V, Ga, Al, As, or a combination thereof. In the solid ion conductor compound represented by Formula 7, for example, M5 may include Na, K, Rb, Cs, or a combination thereof.

The appropriate monovalent cation of Groups 2 to 11 of the periodic table may be, for example, Cu or Ag. The appropriate divalent cation selected from Groups 2 to 11 of the periodic table may be, for example, Ca, Zn, Mg, or Fe.

The solid ion conductor compound represented by Formula 1 may be, for example, a solid ion conductor compound represented by Formula 8:

$$Li_{7-z}PS_{6-w-z}M2_wM3_z \quad \text{Formula 8}$$

In Formula 8, M2 is $SO_n$; M3 is an element of Group 17 of the periodic table; and $0\leq w<2$, $0\leq z\leq2$, and $1.5\leq n\leq5$. In an aspect, M3 is at least one element of Group 17.

The solid ion conductor compound represented by Formula 1 may be, for example, a solid ion conductor compound represented by one of Formulae 9 or 10:

$$Li_{a+fc}P(S_{1+fc-e}M2_e)_b(M3_{1-f}M2_f)_c \quad \text{Formula 9}$$

$$Li_aP(S_{1-e}M2_e)_bM3_c \quad \text{Formula 10}$$

In Formulae 9 and 10, M2 is $SO_4$; M3 is at least one element of Group 17 of the periodic table; $5\leq a\leq7$, $4\leq b\leq6$, and $0\leq c\leq2$; and $0<e\leq0.08$, $0<f\leq0.08$, and $0<e+f\leq0.08$. In an aspect, M3 is a single element of Group 17.

In the solid ion conductor compound represented by Formula 9, for example, some chlorine atoms may be precipitated as LiCl due to substitution of M2 in the S sites.

The solid ion conductor compound represented by Formula 1 may be, for example, a solid ion conductor compound represented by Formula 11 or 12:

$$Li_{a+fc}P(S_{1+fc-e}(SO_4)_e)_b(M3_{1-f}(SO_4)_f)_c \quad \text{Formula 11}$$

$$Li_aP(S_{1-e}(SO_4)_e)_bM3_c \quad \text{Formula 12}$$

In Formula 11 or 12, M3 is an element of Group 17 of the periodic table; $5\leq a\leq7$, $4\leq b\leq6$, and $0\leq c\leq2$; and $0<e<0.08$, $0<f<0.08$, and $0<e+f<0.08$. In an aspect, M3 is at least one element of Group 17. In an aspect, M3 is a single element of Group 17.

In the solid ion conductor compound represented by Formula 11, for example, some chlorine atoms may be precipitated as LiCl due to substitution of $SO_4$ in the S sites.

The solid ion conductor compound represented by Formula 1 may be a solid ion conductor compound represented by at least one of:

$Li_{a+fc}P(S_{1+fc-e}(SO_4)_e)_b(F_{1-f}(SO_4)_f)_c$, $Li_{a+fc}P(S_{1+fc-e}(SO_4)_e)_b(Cl_{1-f}(SO_4)_f)_c$, $Li_{a+fc}P(S_{1+fc-e}(SO_4)_e)_b(Br_{1-f}(SO_4)_f)_c$, $Li_{a+fc}P(S_{1+fc-e}(SO_4)_e)_b(I_{1-f}(SO_4)_f)_c$, $Li_aP(S_{1-e}(SO_4)_e)_bF_c$, $Li_aP(S_{1-e}(SO_4)_e)_bCl$, $Li_aP(S_{1-e}(SO_4)_e)_bBr_c$, or $Li_aP(S_{1-e}(SO_4)_e)_bI_c$.

In the formulae above, a, b, c, e, and f are each independently selected, and $5\leq a\leq7$, $4\leq b\leq6$, and $0\leq c\leq2$; and $0<e<0.06$, $0<f<0.06$, and $0<e+f<0.06$.

The solid ion conductor compound represented by Formula 1 provides an improved lithium ion conductivity. The solid ion conductor compound represented by Formula 1 provides an improved lithium ion conductivity of about 1 milliSiemens per centimeter (mS/cm) or greater, about 1.5 mS/cm or greater, about 2.0 mS/cm or greater, about 2.5 mS/cm or greater, about 3.0 mS/cm or greater, about 3.5 mS/cm or greater, about 4.0 mS/cm or greater, or about 5.0 mS/cm or greater, at room temperature, for example, at about 25° C. The solid ion conductor compound represented by Formula 1 provides an ion conductivity in a range of about 1.0 mS/cm to about 500 mS/cm, about 1.5 mS/cm to about 400 mS/cm, about 2.0 mS/cm to about 300 mS/cm, about 2.5 mS/cm to about 200 mS/cm, about 3.0 mS/cm to about 150 mS/cm, about 3.5 mS/cm to about 100 mS/cm, about 4.0 mS/cm to about 100 mS/cm, or about 5.0 mS/cm to about 100 mS/cm at room temperature, for example, at about 25° C. Thus, in the electrochemical cell including a cathode; an anode; and a solid ion conductor compound represented by Formula 1 disposed between the cathode and the anode, ion delivery between the cathode and the anode may be effectively performed, and thus an internal resistance between the cathode and the anode may decrease. The ion conductivity may be measured by using a direct current (DC) polarization method. In an embodiment, the ion conductivity may be measured using a complex impedance method.

The solid ion conductor compound represented by Formula 1 may, for example, have an ion conductivity retention of about 70% or greater, about 75% or greater, or about 80% or greater, e.g., about 70% to about 99.9%, or about 80% to about 99%, after 10 days under a dry condition of the air atmosphere having a dew point lower than about −60° C. The ion conductivity retention may be, for example, defined as shown in Equation 1. In Equation 1, an initial ion conductivity of a solid ion conductor compound denotes an ion conductivity of the solid ion conductor compound before storing in the dry condition. The ion conductivity retention may be measured by using a method described in Evaluation Example 3.

Ion conductivity retention=[ion conductivity of the solid ion conductor compound after 10 days/ initial ion conductivity of the solid ion conductor compound]×100%     Equation 1

The solid ion conductor compound represented by Formula 1 may belong to, for example, a cubic crystal system or, more particularly, to an F-43m space group. Also, the solid ion conductor compound represented by Formula 1 may be an argyrodite-type sulfide having an argyrodite-type crystal structure. The solid ion conductor compound represented by Formula 1 includes oxygen atoms as some sulfur (S) sites are substituted by $SO_4^{2-}$ anions and thus may provide an improved lithium ion conductivity and improved oxidation-resistance and atmospheric stability at the same time. Also, when some lithium sites in the argyrodite-type crystal structure are substituted by at least one element selected from a $M1^+$ cation element, a $M1^{2+}$ cation element, and a $M1^{3+}$ cation element, the solid ion conductor compound represented by Formula 1 may provide an improved lithium ion conductivity and improved electrochemical stability with respect to lithium metal at the same time.

Figure 1B:
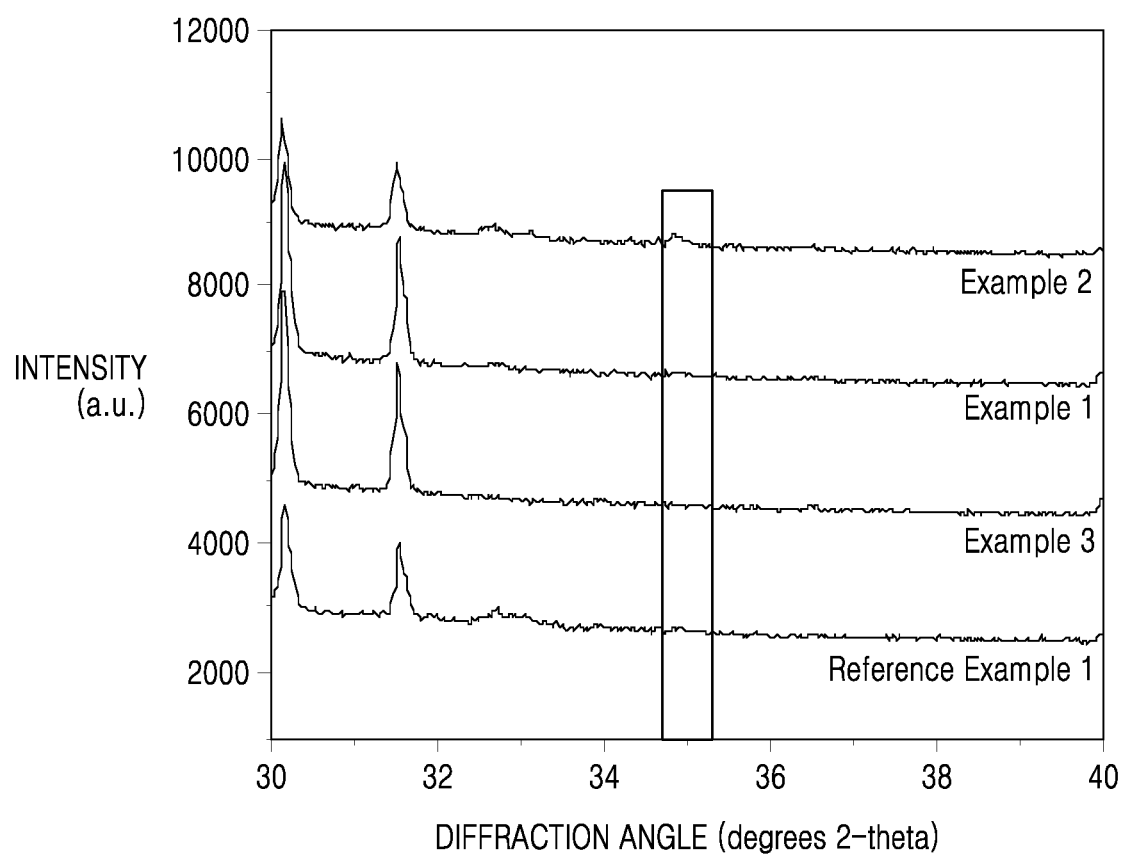
FIG. 1B is an enlarged view of a portion in FIG. 1A.
Figure 1C:
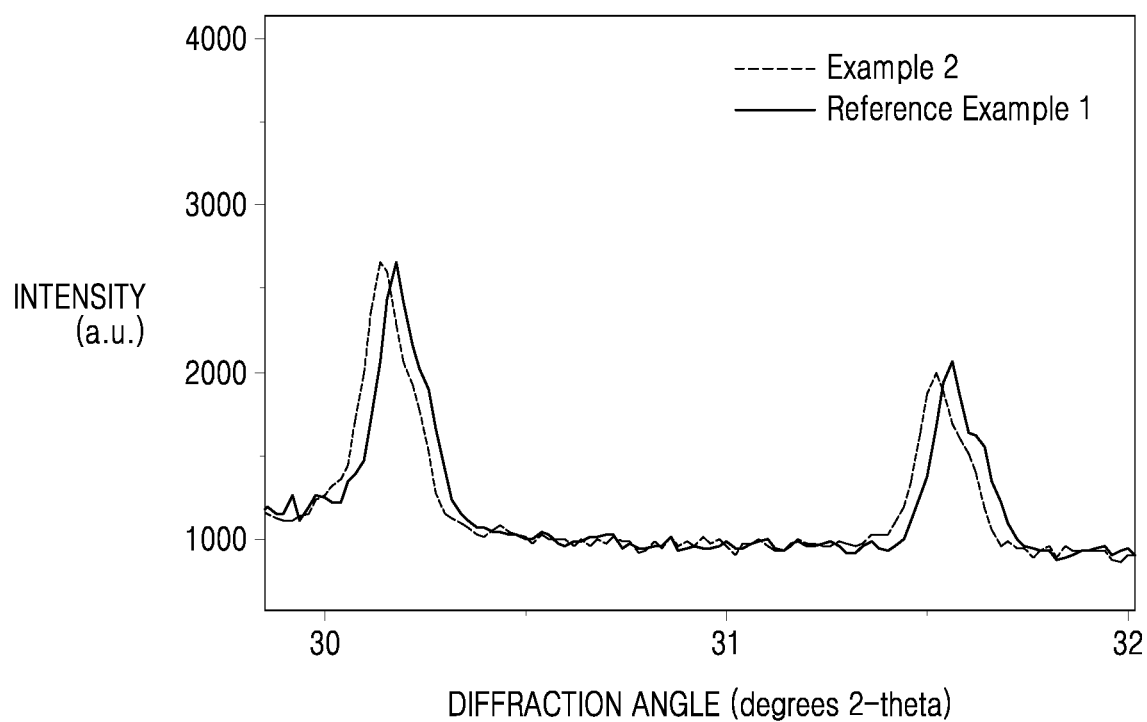
FIG. 1C is an enlarged view of a portion in FIG. 1B.

Referring to FIG. 1C, the solid ion conductor compound represented by Formula 1 has, for example, a first peak at a diffraction angle of 30.1°2θ±0.5°2θ and a second peak at a diffraction angle of 31.5°2θ±0.5°2θ when analyzed by X-ray diffraction using CuKα radiation, and a compound having the same composition with that of the solid ion conductor compound represented by Formula 1, except that M2 is changed to S, has a third peak at a diffraction angle of 30.1°2θ±0.5°2θ and a fourth peak at a diffraction angle of 31.5°2θ±0.5°2θ when analyzed by X-ray diffraction using a CuKα radiation, wherein positions of the first peak and the second peak may be downshifted about 0.01° or more, about 0.02° or more, about 0.03° or more, or about 0.04° or more, e.g., about 0.01° to about 0.5°, or about 0.05° to about 0.1°, compared to those of the third peak and the fourth peak, respectively. The downshift of peaks is due to distances between faces of the crystal lattice increased by substituting $SO_4$ having a larger ion radius than that of sulfur (S). The solid ion conductor compound having increased distances between faces of the crystal lattice may provide improved oxidation-resistance and atmospheric stability.

Referring to FIG. 1B, the solid ion conductor compound represented by Formula 1 may further have, for example, an additional peak corresponding to LiM3 re-precipitated by M2 at a diffraction angle of 35.0°2θ±1.0°2θ when analyzed by X-ray diffraction using a CuKα radiation. The LiM3 may be, for example, LiCl. The solid ion conductor compound having the additional peak may provide improved oxidation-resistance and atmospheric stability.

In an aspect, the disclosed compound of Formula 1 can be used to provide a protected cathode active material. The cathode active material may comprise a lithium transition metal oxide, a transition metal sulfide, a lithium transition metal sulfide, or a combination thereof. The compound of Formula 1 may be on a surface of the cathode active material. For example, the compound of Formula 1 may be on a surface of the cathode active material as a layer. A thickness of the layer may be about 1 nanometer (nm) to about 1000 nm, or about 10 nm to about 100 nm.

Solid Electrolyte

A solid electrolyte according to another embodiment includes the solid ion conductor compound represented by Formula 1. The solid electrolyte may be in a form of a layer comprising, e.g., consisting of, the compound of Formula 1. The layer may be between a cathode and an anode, or the layer may be on a cathode active material, or on an anode active material. Due to including the solid ion conductor compound, the solid electrolyte may have a high ion conductivity and high chemical stability. The solid electrolyte including the solid ion conductor compound represented by Formula 1 may provide improved stability with respect to air and electrochemical stability with respect to lithium metal. Therefore, the solid ion conductor compound represented by Formula 1 may be used as, for example, a solid electrolyte of an electrochemical cell. The solid electrolyte may further include a second solid electrolyte in addition to the solid ion conductor compound represented by Formula 1. For example, the solid electrolyte may further include a sulfide-based solid electrolyte and/or an oxide-based solid electrolyte. Examples of the second solid electrolyte that is further included in the solid electrolyte may include $Li_2O$—$Al_2O_3$—$TiO_2$—$P_2O_5$ (LATP), a lithium super ionic conductor (LISICON), $Li_{3-y}PO_{4-x}N_x$ (LIPON, where 0<y<3 and 0<x<4), $Li_{3.25}Ge_{0.25}P_{0.75}S_4$ (Thio-LISICON), $Li_2S$, $Li_2S$—$P_2S$, $Li_2S$—$SiS_2$, $Li_2S$—$GeS_2$, $Li_2S$—$B_2S_5$, or $Li_2S$—$Al_2S$, but embodiments are not limited thereto, and any suitable material available as a solid ion conductor compound in the art may be used.

The solid electrolyte may be in a powder form or a monolithic form. The solid electrolyte in a monolithic form may be, for example, in the form of a pellet, a sheet, or a thin film, but embodiments are not limited thereto, and the solid electrolyte may be in various forms according to its purpose of use.

Electrochemical Cell

An electrochemical cell according to another embodiment includes a cathode layer including a cathode active material layer; an anode layer including an anode active material layer; and an electrolyte layer disposed between the cathode layer and the anode layer, wherein the cathode active material layer and/or the electrolyte layer include the solid ion conductor compound represented by Formula 1. When the electrochemical cell includes the solid ion conductor compound represented by Formula 1, lithium ion conductivity and stability with respect to lithium metal of the electrochemical cell improve.

The electrochemical cell may be, for example, an all-solid secondary battery, a secondary battery containing a liquid electrolyte, or a lithium air battery, but embodiments are not limited thereto, and any suitable material available as an electrochemical cell in the art may be used.

Hereinafter, the all-solid secondary battery will be described in further detail.

All-Solid Secondary Battery: First Type

The all-solid secondary battery may include the solid ion conductor compound represented by Formula 1.

The all-solid secondary battery may include, for example, a cathode layer including a cathode active material layer; an anode layer including an anode active material layer; and an electrolyte layer disposed between the cathode layer and the anode layer, wherein the cathode active material layer and/or the electrolyte layer may include the solid ion conductor compound represented by Formula 1.

The all-solid secondary battery according to another embodiment may be prepared as follows.

Solid Electrolyte Layer

The solid electrolyte layer may be prepared by mixing the solid ion conductor compound represented by Formula 1 and a binder, and drying the mixture, or by roll-pressing a powder of the solid ion conductor compound represented by Formula 1 into a regular shape by applying a pressure in a range of about 1 ton to about 10 tons. The solid ion conductor compound represented by Formula 1 may be used as a solid electrolyte.

A particle diameter of the solid electrolyte may be, for example, in a range of about 0.5 micrometer ($\mu m$) to about 20 $\mu m$, or about 0.5 $\mu m$ to about 15 $\mu m$, or about 1 $\mu m$ to about 10 $\mu m$. When a particle diameter of the solid electrolyte is within this range, a bonding property in the process of forming a sintered body improves, and thus an ion conductivity and life characteristics of the solid electrolyte particles may improve.

A thickness of the solid electrolyte layer may be in a range of about 10 $\mu m$ to about 200 $\mu m$, or about 20 $\mu m$ to about 150 $\mu m$, or about 30 $\mu m$ to about 100 $\mu m$. When a thickness of the solid electrolyte layer is within this range, sufficient migration rate of lithium ions may be secured, which may result in high ion conductivity.

The solid electrolyte layer may further include a solid electrolyte such as a sulfide-based (i.e., sulfide-containing) solid electrolyte and/or oxide-based solid electrolyte in addition to the solid ion conductor compound represented by Formula 1.

Examples of the sulfide-based solid electrolyte may include a lithium sulfide, a silicon sulfide, a phosphorus sulfide, a boron sulfide, or a combination thereof. Examples of the sulfide-based solid electrolyte may include $Li_2S$, $P_2S_5$, $SiS_2$, $GeS_2$, $B_2S_3$, or a combination thereof. Examples of the sulfide-based solid electrolyte may include $Li_2S$ and/or $P_2S$. The sulfide-based solid electrolyte are known as having a lithium ion conductivity higher than those of other inorganic compounds. Examples of the sulfide-based solid electrolyte may include $Li_2S$ or $P_2S_5$. When sulfide-based electrolyte materials constituting the sulfide-based solid electrolyte include $Li_2S-P_2S_5$, a mixing molar ratio of $Li_2S$ to $P_2S_5$ may be, for example, in a range of about 50:50 to about 90:10. Also, an inorganic solid electrolyte prepared by adding $Li_3PO_4$, a halogen compound, $Li_{2+2x}Zn_{1-x}GeO_4$ (LISICON, where 0<x<1), $Li_{3+y}PO_{4-x}N_x$ (LIPON, where 0<y<3 and 0<x<4), $Li_{3.25}Ge_{0.25}P_{0.75}S_4$ (Thio-LISICON), and $Li_2O-Al_2O_3-TiO_2-P_2O_5$ (LATP) to an inorganic solid electrolyte of $Li_2S-P_2S_5$, $SiS_2$, $GeS_2$, $B_2S_3$, or a combination thereof may be used as the sulfide-based solid electrolyte. Examples of the sulfide-based solid electrolyte materials may include $Li_2S-P_2S$; $Li_2S-P_2S-LiX$ (where X is a halogen element); $Li_2S-P_2S_5-Li_2O$; $Li_2S-P_2S-Li_2O-LiI$; $Li_2S-SiS_2$; $Li_2S-SiS_2-LiI$; $Li_2S-SiS_2-LiBr$; $Li_2S-SiS_2-LiCl$; $Li_2S-SiS_2-B_2S_3-LiI$; $Li_2S-SiS_2-P_2S_5-LiI$; $Li_2S-B_2S_3$; $Li_2S-P_2S_5-Z_mS_n$ (where m and n are each a positive integer, and Z is Ge, Zn, or G); $Li_2S-GeS_2$; $Li_2S-SiS_2-Li_3PO_4$; and $Li_2S-SiS_2-Li_pMO_q$ (where p and q are each a positive integer, and M is P, Si, Ge, B, Al, Ga, or In). In this regard, the sulfide-based solid electrolyte materials may be prepared by treating starting materials (e.g., $Li_2S$ or $P_2S$) of the sulfide-based solid electrolyte materials by a melt quenching method or a mechanical milling method. Also, a calcination process may follow the treatment.

Examples of a binder included in the solid electrolyte layer may include styrene butadiene rubber (SBR), polytetrafluoroethylene, polyvinylidene fluoride, polyethylene, and polyvinyl alcohol, but embodiments are not limited thereto, and any suitable material available as a binder in the art may be used. The binder of the solid electrolyte layer may be identical to or different from a binder of the cathode layer and the anode layer.

Cathode Layer

The cathode layer may be prepared by forming a cathode active material layer including a cathode active material on a current collector. An average particle diameter of the cathode active material may be, for example, in a range of about 2 $\mu m$ to about 10 $\mu m$.

The cathode active material may be any suitable material available as a cathode active material in a secondary battery in the art. Examples of the cathode active material may include a lithium transition metal oxide, a transition metal sulfide and a lithium transition metal sulfide. For example, the cathode active material may be at least one composite oxide of lithium with Co, Mn, Ni, or a combination thereof. In some embodiments, the cathode active material may be a compound represented by:

$Li_aA_{1-b}B_bD_2$ (where $0.90 \leq a \leq 1.8$ and $0 \leq b \leq 0.5$); $Li_aE_{1-b}B'_bO_{2-c}D$ (where $0.90 \leq a \leq 1.8$, $0 \leq b \leq 0.5$, and $0 \leq c \leq 0.05$); $LiE_{2-b}B'_bO_{4-c}$(where $0 \leq b \leq 00.5$ and $0 \leq c \leq 0.05$); $Li_aNi_{1-b-c}Co_bB'D_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cD_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a < 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2G_bO_4$ (where $0.90 \leq a \leq 1.8$ and $0.001 \leq b \leq 0.1$); $QO_2$; $QS_2$; $LiQS_2$; $V_2O_5$; $LiV_2O_2$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); or $LiFePO_4$. In the formulae above, A may include nickel (Ni), cobalt (Co), manganese (Mn), or a combination thereof; B' may include aluminum (Al), nickel (Ni), cobalt (Co), manganese (Mn), chromium (Cr), iron (Fe), magnesium (Mg), strontium (Sr), vanadium (V), a rare earth element, or a combination thereof; D may include oxygen (O), fluorine (F), sulfur (S), phosphorus (P), or a combination thereof; E may include cobalt (Co), manganese (Mn), or a combination thereof; F' may include fluorine (F), sulfur (S), phosphorus (P), or a combination thereof; G may include aluminum (Al), chromium (Cr), manganese (Mn), iron (Fe), magnesium (Mg), lanthanum (La), cerium (Ce), strontium (Sr), vanadium (V), or a combination thereof; Q may include titanium (Ti), molybdenum (Mo), manganese (Mn), or a combination thereof; I' may include chromium (Cr), vanadium (V), iron (Fe), scandium (Sc), yttrium (Y), or a combination thereof; and J may include vanadium (V), chromium (Cr), manganese (Mn), cobalt (Co), nickel (Ni), copper (Cu), or a combination thereof.

In some embodiments, the cathode active material may be $LiCoO_2$, $LiMn_xO_{2x}$ (where x is 1 or 2), $LN_{1-x}Mn_xO_{2x}$ (where $0<x<1$), $LN_{1-x-y}Co_xMn_yO_2$ (where $0 \le x \le 0.5$ and $0 \le y \le 0.5$), $LiNi_{1-x-y}Co_xAl_yO_2$ (where $0 \le x \le 0.5$ and $0 \le y \le 0.5$), $LiFePO_4$, $TiS_2$, $FeS_2$, $TiS_3$, or $FeS_3$. In the compound, A may be Ni, Co, Mn, or a combination thereof; B may be Al, Ni, Co, Mn, Cr, Fe, Mg, Sr, V, a rare earth element, or a combination thereof; D may be O, F, S, P, or a combination thereof; E may be Co, Mn, or a combination thereof; F may be F, S, P, or a combination thereof; G may be Al, Cr, Mn, Fe, Mg, La, Ce, Sr, V, or a combination thereof; Q may be Ti, Mo, Mn, or a combination thereof; I may be Cr, V, Fe, Sc, Y, or a combination thereof; and J may be V, Cr, Mn, Co, Ni, Cu, or a combination thereof.

The compounds listed above as cathode active materials may have a surface coating layer (hereinafter, also referred to as "coating layer"). Alternatively, a mixture of a compound without a coating layer and a compound having a coating layer, the compounds being selected from the compounds listed above, may be used. In some embodiments, the coating layer may include, for example, a coating element compound of an oxide, a hydroxide, an oxyhydroxide, an oxycarbonate, or a hydroxycarbonate of the coating element. In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In some embodiments, the coating layer may be formed using any method that does not adversely affect the physical properties of the cathode active material. For example, the coating layer may be formed using a spray coating method or a dipping method. The coating methods may be well understood by one of ordinary skill in the art, and thus a detailed description thereof will be omitted.

The cathode active material may include, for example, a lithium salt of a transition metal oxide that has a layered rock-salt type structure among the examples of the lithium transition metal oxide. For example, the "layered rock-salt type structure" refers to a structure in which an oxygen atom layer and a metal atom layer are alternately and regularly arranged in a <111> direction in a cubic rock-salt type structure, where each of the atom layers forms a two-dimensional flat plane. The "cubic rock-salt type structure" refers to a sodium chloride (NaCl) type structure, which is one of crystalline structures, in particular, to a structure in which face-centered cubic (fcc) lattices respectively formed of anions and cations are shifted by only a half of the ridge of each unit lattice. Examples of the lithium transition metal oxide having the layered rock-salt type structure may include a ternary lithium transition metal oxide expressed as $LiNi_xCo_yAl_zO_2$ (NCA) or $LiNi_xCo_yMn_zO_2$ (NCM) (where $0<x<1$, $0<y<1$, $0<z<1$, and $x+y+z=1$). When the cathode active material includes a ternary lithium transition metal oxide having the layered rock-salt type structure, an energy density and thermal stability of an all-solid secondary battery may further improve.

The cathode active material may be covered by a coating layer as described above. The coating layer may comprise any suitable material that may be used as a coating layer of a cathode active material of an all-solid secondary battery in the art. The coating layer may be, for example, $Li_2O$—$ZrO_2$ (LZO).

When the cathode active material includes nickel (Ni) as a ternary lithium transition metal oxide such as NCA or NCM, a capacity density of the all-solid secondary battery increases, and thus metal elution from the cathode active material in a charged state may be reduced. As a result, cycle characteristics of the all-solid secondary battery improve.

A shape of the cathode active material may be, for example, particle shapes such as a true spherical shape or an elliptical spherical shape. A particle diameter of the cathode active material is not particularly limited and may be in a range applicable to a cathode active material of an all-solid secondary battery. An amount of the cathode active material of the cathode layer is not particularly limited and may be in a range applicable to a cathode layer of an all-solid secondary battery. In the cathode active material layer, an amount of the cathode active material may be, for example, in a range of about 50 weight % to about 95 weight %.

The cathode active material layer may further include the solid ion conductor compound represented by Formula 1.

The cathode active material layer may include a binder. Examples of the binder may include styrene butadiene rubber (SBR), polytetrafluoroethylene, polyvinylidene fluoride, and polyethylene.

The cathode active material layer may include a conducting agent. Examples of the conducting agent may include graphite, carbon black, acetylene black, Ketjen black, carbon fibers, and metal powders.

The cathode active material layer may further include additives such as a filler, a coating agent, a dispersant, and an ion conducting agent, in addition to the cathode active material, solid electrolyte, binder, and conducting agent.

The filler, the dispersant, and the ion conducting agent that may be added to the cathode active material layer may be materials that are generally used in an electrode of an all-solid secondary battery.

The cathode current collector may be a plate or a foil formed of, for example, aluminum (Al), indium (In), copper (Cu), magnesium (Mg), stainless steel, titanium (Ti), iron (Fe), cobalt (Co), nickel (Ni), zinc (Zn), germanium (Ge), lithium (Li), or an alloy thereof. The cathode current collector may be omitted.

The cathode current collector may further include a carbon layer disposed on one surface or two surfaces of a metal substrate. When the carbon layer is additionally disposed on the metal substrate, corrosion of a metal of the metal substrate by the solid electrolyte in the cathode layer may be prevented, and an interfacial resistance between the cathode active material layer and the cathode current collector may be decreased. A thickness of the carbon layer may be, for example, in a range of about 1 µm to about 5 µm. When a thickness of the carbon layer is too thin, contact between the metal substrate and the solid electrolyte may not be completely blocked. When a thickness of the carbon layer is too thick, an energy density of the all-solid secondary battery may deteriorate. The carbon layer may include amorphous carbon or crystalline carbon.

Anode Layer

The anode layer may be prepared in the same manner as the preparation of the cathode layer, except that an anode active material is used instead of a cathode active material. The anode layer may be prepared by forming an anode active material layer including an anode active material on an anode current collector.

The anode active material layer may additionally include the solid ion conductor compound represented by Formula 1.

The anode active material may be a lithium metal, a lithium metal alloy, or a combination thereof.

The anode active material layer may further include an anode active material in addition to a lithium metal, a lithium metal alloy, or a combination thereof. Examples of the anode active material may include at least one of a metal alloyable with lithium, a transition metal oxide, a non-transition metal oxide, or a carbonaceous material. Examples of the metal alloyable with lithium may be Ag, Si, Sn, Al, Ge, Pb, Bi, Sb, a Si—Y' alloy (where Y' is an alkali metal, an alkaline earth metal, a Group 13 element, a Group 14 element, a Group 15 element, a Group 16 element, a transition metal, a rare earth element, or a combination thereof, and Y is not Si), and a Sn—Y' alloy (where Y' is an alkali metal, an alkaline earth metal, a Group 13 element, a Group 14 element, a Group 15 element, a Group 16 element, a transition metal, a rare earth element, or a combination thereof, and Y' is not Sn). In some embodiments, Y' may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), thallium (Tl), germanium (Ge), phosphorus (P), arsenic (As), antimony (Sb), bismuth (Bi), sulfur (S), selenium (Se), tellurium (Te), polonium (Po), or a combination thereof. Examples of the transition metal oxide may include a lithium titanium oxide, a vanadium oxide, and a lithium vanadium oxide. Examples of the non-transition metal oxide may include $SnO_2$ and $SiO_x$ (where $0<x<2$). Examples of the carbonaceous material may include crystalline carbon, amorphous carbon, or a mixture thereof. Examples of the crystalline carbon are graphite, such as natural graphite or artificial graphite that are in shapeless, plate, flake, spherical, or fibrous form. Examples of the amorphous carbon are soft carbon (carbon sintered at low temperatures), hard carbon, meso-phase pitch carbonization products, and sintered cokes.

Figure 2:
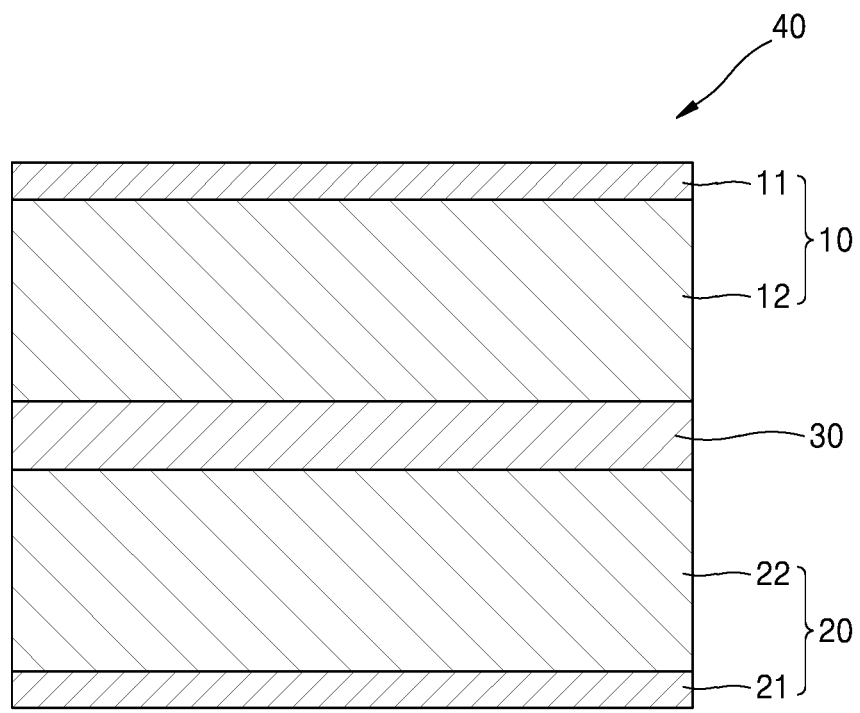
FIG. 2 is a schematic view of an all-solid secondary battery according to an embodiment.

Referring to FIG. 2, the all-solid secondary battery 40 according to an embodiment includes a solid electrolyte layer 30, a cathode layer 10 disposed on one surface of the solid electrolyte layer 30, and an anode layer 20 disposed on the other surface of the solid electrolyte layer 30. The cathode layer 10 includes a cathode active material layer 12 in contact with the solid electrolyte layer 30; and a cathode current collector 11 that contacts the cathode active material layer 12, and the anode layer 20 includes an anode active material layer 22 in contact with the solid electrolyte layer 30; and an anode current collector 21 in contact with the anode active material layer 22. The all-solid secondary battery 40 may be completed, for example, by forming the cathode active material layer 12 and the anode active material layer 22 on both surfaces of the solid electrolyte layer 30; and forming the cathode current collector 11 and the anode current collector 21 on the cathode active material layer 12 and the anode active material layer 22, each respectively. In some embodiments, the all-solid secondary battery 40 may be completed by, for example, sequentially stacking the anode active material layer 22, the solid electrolyte layer 30, the cathode active material layer 12, and the cathode current collector 11 on the anode current collector 21.

All-Solid Secondary Battery: Second Type

Figure 3:
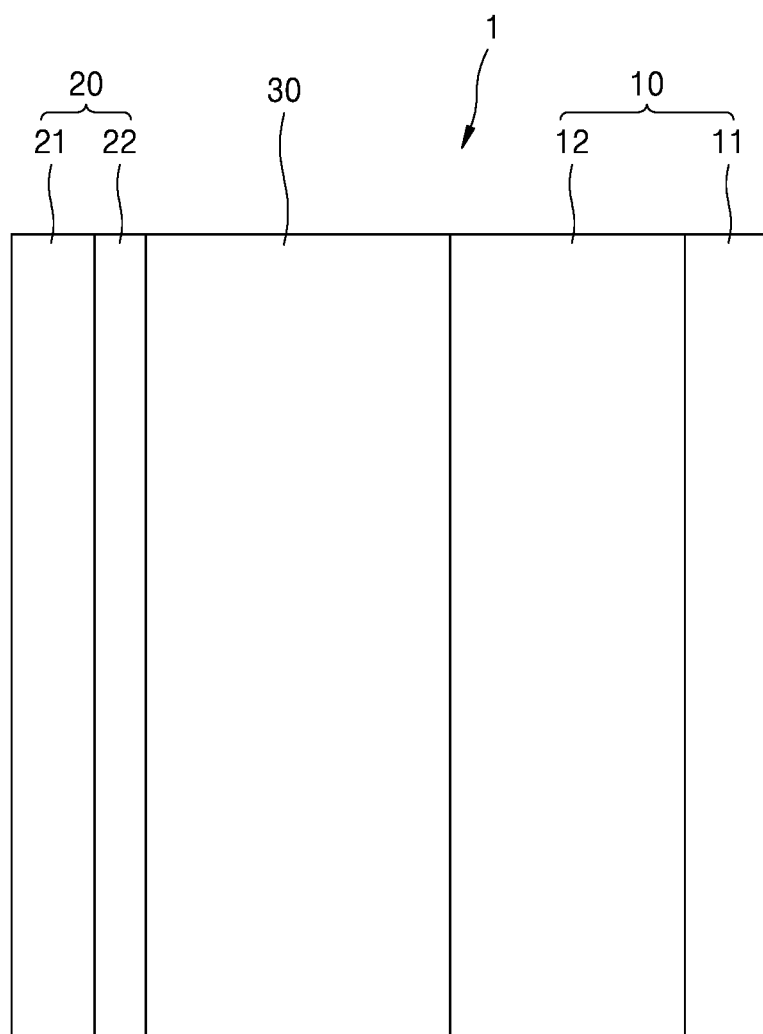
FIG. 3 is a schematic view of an all-solid secondary battery according to another embodiment.
Figure 4:
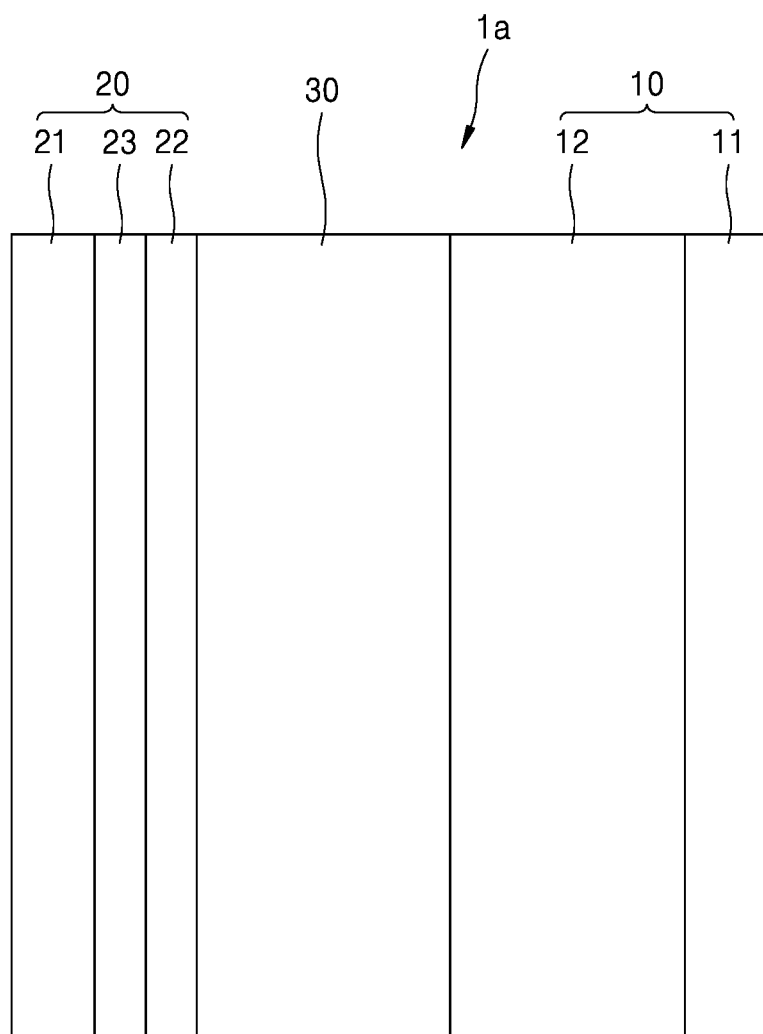
FIG. 4 is a schematic view of an all-solid secondary battery according to another embodiment.

Referring to FIGS. 3 and 4, the all-solid secondary battery 1 may include, for example, a cathode layer 10 including a cathode active material layer 12 disposed on a cathode current collector 11; an anode layer 20 including an anode active material layer 22 disposed on an anode current collector 21; and an electrolyte layer 30 disposed between the cathode layer 10 and the anode layer 20, wherein the cathode active material layer 12 and/or the electrolyte layer 30 may include a solid ion conductor compound represented by Formula 1.

The all-solid secondary battery 1 according to another embodiment may be prepared as follows.

The cathode layer 10 and the solid electrolyte layer 30 are prepared in the same manner as in the all-solid secondary battery according to an embodiment described above.

Anode Layer

Next, the anode layer 20 is prepared.

Referring to FIGS. 3 and 4, the anode layer 20 may include an anode current collector 21 and an anode active material layer 22 disposed on the anode current collector 21, and the anode active material 22 may include, for example, an anode active material and a binder.

The anode active material included in the anode active material layer 22 may be, for example, in the form of particles. An average particle diameter of the anode active material in the form of particles may be, for example, about 4 μm or less, about 3 μm or less, about 2 μm or less, about 1 μm or less, or about 900 nm or less. An average particle diameter of the anode active material in the form of particles may be, for example, in a range of about 10 nm to about 4 μm or less, about 10 nm to about 3 μm or less, about 10 nm to about 2 μm or less, about 10 nm to about 1 μm or less, or about 10 nm to about 900 nm or less. When the average particle diameter of the anode active material is within these ranges, reversible absorbing and/or desorbing of lithium during charging/discharging may further be facilitated. The average particle diameter of the anode active material may be, for example, a median diameter (D50) measured by using a laser diffraction particle diameter distribution meter.

The anode active material in the anode active material layer 22 may include, for example, at least one of a carbonaceous anode active material, a metal, or a metalloid anode active material.

The carbonaceous anode active material may be, for example, particularly, amorphous carbon. Examples of the amorphous carbon may include carbon black (CB), acetylene black (AB), furnace black (FB), Ketjen black (KB), and graphene, but embodiments are not limited thereto, and any suitable material available as amorphous carbon in the art may be used. The amorphous carbon refers to carbon that has no crystallinity or a very low crystallinity, which may be different from crystalline carbon or graphite carbon.

For example, the metal or metalloid anode active material may include at least one of gold (Au), platinum (Pt), palladium (Pd), silicon (Si), silver (Ag), aluminum (Al), bismuth (Bi), tin (Sn), or zinc (Zn), but embodiments are not limited thereto, and any suitable material that is available as a metal anode active material or a metalloid anode active material capable of forming an alloy or a compound with lithium in the art may be used. For example, nickel (Ni) does not form an alloy with lithium and thus is not a metal anode active material.

The anode active material layer 22 may include at least one of these anode active materials, e.g., a mixture of a plurality of different anode active materials. For example, the anode active material layer 22 may only include amorphous carbon or may include at least one of gold (Au), platinum (Pt), palladium (Pd), silicon (Si), silver (Ag), aluminum (Al), bismuth (Bi), tin (Sn), or zinc (Zn). In some embodiments, the anode active material layer 22 may include a mixture including amorphous carbon and at least one of gold (Au), platinum (Pt), palladium (Pd), silicon (Si), silver (Ag), aluminum (Al), bismuth (Bi), tin (Sn), or zinc (Zn). A mixing ratio of amorphous carbon to gold and the like may be a weight ratio in a range of about 10:1 to about 1:2, about 5:1 to about 1:1, or about 4:1 to about 2:1, but embodiments are not limited thereto, and the mixing ratio may be selected according to characteristics of the all-solid secondary battery 1. When the anode active material has the composition, cycle characteristics of the all-solid secondary battery 1 may further improve.

The anode active material in the anode active material layer 22 may include, for example, a mixture including first particles formed of amorphous carbon and second particles formed of a metal or a metalloid. Examples of the metal or metalloid may include gold (Au), platinum (Pt), palladium (Pd), silicon (Si), silver (Ag), aluminum (Al), bismuth (Bi), tin (Sn), or zinc (Zn). In some embodiments, the metalloid may be a semiconductor. An amount of the second particles may be in a range of about 8 weight % to about 60 weight %, about 10 weight % to about 50 weight %, about 15 weight % to about 40 weight %, or about 20 weight % to about 30 weight % based on the total weight of the mixture. When the amount of the second particles is within these ranges, for example, cycle characteristics of the all-solid secondary battery 1 may further improve.

Examples of the binder in the anode active material layer 22 may include styrene-butadiene rubber (SBR), polytetrafluoroethylene (PTFE), polyvinylidene fluoride (PVDF), polyethylene, a vinylidene fluoride/hexafluoropropylene copolymer, polyacrylonitrile (PAN), and polymethylmethacrylate (PMMA), but embodiments are not limited thereto, and any suitable material available as a binder in the art may be used. The binder may be formed of one of the examples of the binder alone or a plurality of different binders.

When the anode active material layer 22 includes the binder, the anode active material layer 22 is stabilized on the anode current collector 21. Also, cracks of the anode active material layer 22 may be suppressed despite of volume change and/or relative location change of the anode active material layer 22 during charging/discharging. For example, when the anode active material layer 22 does not include a binder, the anode active material layer 22 may be easily separated from the anode current collector 21. When the anode active material layer 22 is detached from the anode current collector 21, a possibility of a short-circuit occurring may increase as the anode current collector 21 contacts the solid electrolyte layer 30 at the exposed part of the anode current collector 21. The anode active material layer 22 may be prepared by, for example, coating and drying a slurry, in which materials forming the anode active material layer 22 are dispersed, on the anode current collector 21. When the binder is included in the anode active material layer 22, the anode active material may be stably dispersed in the slurry. For example, when the slurry is coated on the anode current collector 21 by using a screen printing method, clogging of the screen (e.g., clogging by an aggregate of the anode active material) may be suppressed.

The anode active material layer 22 may further include additives that are used in an all-solid secondary battery, such as a filler, a coating agent, a dispersant, and an ion conducting agent.

A thickness of the anode active material layer 22 may be, for example, about 50% or less, about 40% or less, about 30% or less, about 20% or less, about 10% or less, or about 5% or less of a thickness of the cathode active material layer 12. For example, a thickness of the anode active material layer 22 may be in a range of about 1 μm to about 20 μm, about 2 μm to about 10 μm, or about 3 μm to about 7 μm. When the thickness of the anode active material layer 22 is too thin, lithium dendrite formed between the anode active material layer 22 and the anode current collector 21 destroys the anode active material layer 22, and thus cycle characteristics of the all-solid secondary battery 1 may be difficult to improve. When the thickness of the anode active material layer 22 is too thick, an energy density of the all-solid secondary battery 1 deteriorates and an internal-resistance of the all-solid secondary battery 1 by the anode active material layer 22 increases, and thus cycle characteristics of the all-solid secondary battery 1 may be difficult to improve.

For example, when the thickness of the anode active material layer 22 decreases, a charge capacity of the anode active material layer 22 decreases. The charge capacity of the anode active material layer 22 may be, for example, about 50% or less, about 40% or less, about 30% or less, about 20% or less, about 10% or less, about 5% or less, or about 2% or less of a charge capacity of the cathode active material layer 12. The charge capacity of the anode active material layer 22 may be, for example, in a range of about 0.1% to about 50%, about 0.1% to about 40%, about 0.1% to about 30%, about 0.1% to about 20%, about 0.1% to about 10%, about 0.1% to about 5%, or about 0.1% to about 2% of a charge capacity of the cathode active material layer 12. When the charge capacity of the anode active material layer 22 is too low, a thickness of the anode active material layer 22 is too thin, lithium dendrite formed between the anode active material layer 22 and the anode current collector 21 during repeated charging/discharging processes destroys the anode active material layer 22, and thus cycle characteristics of the all-solid secondary battery 1 may not improve. When the charge capacity of the anode active material layer 22 is too high, an energy density of the all-solid secondary battery 1 deteriorates and an internal resistance of the all-solid secondary battery 1 by the anode active material layer 22 increases, and thus cycle characteristics of the all-solid secondary battery 1 may not improve.

The charge capacity of the cathode active material layer 12 is obtained by multiplying a weight of the cathode active material in the cathode active material layer 12 by a specific charge capacity (milliampere-hours per gram, mAh/g) of the cathode active material. When various types of materials are used as the cathode active material, a value of a specific charge capacity× a weight of each of the cathode active materials is calculated, and the total of these values is a charge capacity of the cathode active material layer 12. A charge capacity of the anode active material layer 22 may be calculated in the same manner. That is, a charge capacity of the anode active material layer 22 is obtained by multiplying a weight of the anode active material in the anode active material layer 22 to a specific charge capacity (mAh/g) of the anode active material. When various types of materials are used as the anode active material, a value of a specific charge capacity× a weight of each of the anode active materials is calculated, and the total of these values is a charge capacity of the anode active material layer 22. Here, the specific charge capacity of the cathode active material and the anode active material are capacities estimated by using an all-solid half-cell in which lithium metal is used as a reference electrode. The specific charge capacity of the cathode active material layer 12 and the anode active material layer 22 are directly measured by charge capacity measurement using an all-solid half-cell. When the measured charge capacity is divided by a weight of each of the active materials, a specific charge capacity may be obtained. In some embodiments, the charge capacities of the cathode active material layer 12 and the anode active material layer 22 may be initial charge capacities measured in the 1st charging cycle.

Referring to FIG. 4, an all-solid secondary battery 1a may further include, for example, a metal layer 23 disposed between an anode current collector 21 and an anode active material layer 22. The metal layer 23 may include lithium or a lithium alloy. Therefore, the metal layer 23 may, for example, function as a lithium reservoir. Examples of the lithium alloy may include a Li—Al alloy, a Li—Sn alloy, a Li—In alloy, a Li—Ag alloy, a Li—Au alloy, a Li—Zn alloy, a Li—Ge alloy, or a Li—Si alloy, but embodiments are not limited thereto, and any suitable material available as a lithium alloy in the art may be used. The metal layer 23 may comprise one of these alloys or lithium or may be formed of a lithium alloy.

A thickness of the metal layer 23 may be, for example, in a range of about 1 μm to about 1000 μm, about 1 μm to about 500 μm, about 1 μm to about 200 μm, about 1 μm to about 150 μm, about 1 μm to about 100 μm, or about 1 μm to about 50 μm, but embodiments are not limited thereto. When the thickness of the metal layer 23 is too thin, the metal layer 23 may be difficult to serve as a lithium reservoir. When the thickness of the metal layer 23 is too thick, a weight and a volume of the all-solid secondary battery 1 increase and cycle characteristics may deteriorate. The metal layer 23 may be, for example, a metal foil having a thickness in these ranges.

In the all-solid secondary battery 1a, the metal layer 23 may be disposed between the anode current collector 21 and the anode active material layer 22 before assembling the all-solid secondary battery 1a or may be precipitated between the anode current collector 21 and the anode active material layer 22 after assembling the all-solid secondary battery 1a. When the metal layer 23 is disposed between the anode current collector 21 and the anode active material layer 22 before assembling the all-solid secondary battery 1, the metal layer 23 includes lithium and thus may function as a lithium reservoir. For example, a lithium foil is disposed between the anode current collector 21 and the anode active material layer 22 before assembling the all-solid secondary battery 1a. In this regard, cycle characteristics of the all-solid secondary battery 1a including the metal layer 23 may further improve. When the metal layer 23 is precipitated by charging after assembling the all-solid secondary battery 1a, an energy density of the all-solid secondary battery 1a increases due to not including the metal layer 23 during the assembling of the all-solid secondary battery 1a. For example, the all-solid secondary battery 1a may be charged over a charge capacity of the anode active material layer 22.

That is, the anode active material layer 22 is overcharged. In the beginning of the charging, lithium is absorbed in the anode active material layer 22. The anode active material in the anode active material layer 22 may form an alloy or a compound with lithium ions migrated from the cathode layer 10.

When the anode active material layer is charged over its capacity, for example, lithium is precipitated on a back surface of the anode active material layer 22, which is between the anode current collector 21 and the anode active material layer 22, and a metal layer corresponding to the metal layer 23 may be formed by the precipitated lithium. The metal layer 23 is a metal layer mainly formed of lithium (i.e., metal lithium). This results because, for example, the anode active material in the anode active material layer 22 is formed of a material capable of forming an alloy or a compound with lithium. In the discharging, lithium of the anode active material layer 22 and the lithium of the metal layer 23 are ionized and migrated in a direction to the cathode layer 10. Thus, lithium may be used as an anode active material in the all-solid secondary battery 1a. Also, since the anode active material layer 22 covers the metal layer 23, the anode active material layer 22 serves as a protection layer of the metal layer 23 and suppresses precipitation growth of lithium dendrite at the same time. Thus, short-circuit and capacity deterioration of the all-solid secondary battery 1a may be suppressed, and as a result, cycle characteristics of the all-solid secondary battery 1a may improve. Also, when the metal layer 23 is formed by charging after the assembling of the all-solid secondary battery 1a, the anode current collector 21, the anode active material layer 22, and a region therebetween are, for example, Li-free regions not including lithium in the initial state or an after-discharge state of the all-solid secondary battery 1a.

The anode current collector 21 may be formed of, for example, a material that does not react with lithium, i.e., does not form both an alloy and a compound. Examples of the material forming the anode current collector 21 may include copper (Cu), stainless steel, titanium (Ti), iron (Fe), cobalt (Co), or nickel (Ni), but embodiments are not limited thereto, and any suitable material available as an electrode current collector in the art may be used. The anode current collector 21 may be formed of one of the examples of the metal or an alloy or a covering material of at least two metals. The anode current collector 21 may be, for example, in the form of a plate or a foil.

The all-solid secondary battery 1 may further include, for example, a thin film including an element alloyable with lithium on the anode current collector 21. The thin film is disposed between the anode current collector 21 and the anode active material layer 22. The thin film includes, for example, an element alloyable with lithium. Examples of the element alloyable with lithium may include gold, silver, zinc, tin, indium, silicon, aluminum, or bismuth, but embodiments are not limited thereto, and any suitable element alloyable with lithium in the art may be used. The thin film is formed of any of these metals or alloys of various metals. When the thin film is disposed on the anode current collector 21, for example, the precipitation form of the metal layer 23 precipitated between the thin film and the anode active material layer 22 may be further flattened, and thus cycle characteristics of the all-solid secondary battery 1 may further improve.

A thickness of the thin film may be, for example, in a range of about 1 nm to about 800 nm, about 10 nm to about 700 nm, about 50 nm to about 600 nm, or about 100 nm to about 500 nm. When the thickness of the thin film is less than 1 nm, functions by the thin film may not be exhibited. When the thickness of the thin film is too thick, the thin film itself absorbs lithium, and a precipitation amount of lithium in an anode may decrease, which results in deterioration of an energy density of the all-solid battery, and thus cycle characteristics of the all-solid secondary battery 1 may be deteriorated. The thin film may be disposed on the anode current collector 21 by using, for example, vacuum vapor deposition, sputtering, or plating, but embodiments are not limited thereto, and any method capable of forming a thin film in the art may be used.

According to another embodiment, a method of preparing a solid ion conductor compound may include contacting a compound including lithium; a compound including a metal element selected from Group 1 to Group 15 of the period table, except Li; a compound including phosphorus (P); a compound including $SO_n$ (where $1.5 \leq n \leq 5$); and a compound including a Group 17 element to prepare a mixture; and heat-treating the mixture in an inert atmosphere to prepare a solid ion conductor compound. The solid ion conductor compound may be, for example, a solid ion conductor compound represented by Formula 1.

The compound including lithium may include a sulfide including lithium. For example, the lithium sulfide is prepared.

The compound including a metal element selected from Group 1 to Group 15 of the periodic table, except Li, includes a sulfide that includes an element selected from Group 1 to Group 15 of the periodic table, except Li. Examples of the sulfide may include a copper sulfide, a silver sulfide, a sodium sulfide ($Na^2S$), a magnesium sulfide, and a potassium sulfide ($K_2S$).

The compound including phosphorus (P) includes a sulfide including phosphorus. Examples of the sulfide including phosphorus may include $P_2S_5$. A compound having Sulfur (S) may be further added in the mixture.

Examples of the compound including $SO_n$ (where $1.5 \leq n \leq 5$) include a lithium salt including $SO_n$. Examples of the compound including $SO_n$ (where $1.5 \leq n \leq 5$) may include $Li_2S_4O_6$, $Li_2S_3O_6$, $Li_2S_2O_3$, $Li_2S_2O_4$, $Li_2S_2O_5$, $Li_2S_2O_6$, $Li_2S_2O_7$, $Li_2S_2O_8$, $Li_2SO_4$, and $Li_2SO_5$.

Examples of the compound including a Group 17 element may include a lithium salt including a Group 17 element. Examples of the lithium salt including a Group 17 element may include LiCl, LiF, LiBr, or LiI.

The compound may be prepared by contacting the starting materials in appropriate amounts, e.g., stoichiometric amounts, to form a mixture and heat-treating the mixture. The contacting may include, for example, milling such as ball milling or pulverization.

The mixture of precursors mixed at a stoichiometric composition may be heat-treated in an inert atmosphere to prepare a solid ion conductor compound.

The heat-treating may be performed at a temperature, for example, in a range of about 400° C. to about 700° C., about 400° C. to about 650° C., about 400° C. to about 600° C., about 400° C. to about 550° C., or about 400° C. to about 500° C. The heat-treating may be performing for, for example, about 1 hour to about 36 hours, about 2 hours to about 30 hours, about 4 hours to about 24 hours, about 10 hours to about 24 hours, or about 16 hours to about 24 hours. The inert atmosphere is an atmosphere including an inert gas. Examples of the inert gas may include nitrogen and argon, but embodiments are not limited thereto, and any gas available as an inert gas in the art may be used.

One or more embodiments will now be described in more detail with reference to the following examples and comparative examples. However, these examples are only for illustrative purposes and are not intended to limit the scope of the one or more embodiments.

EXAMPLES

Preparation of Solid Ion Conductor Compound

Example 1: Preparation of $(Li_{5.69}Cu_{0.06})P(S_{4.70}(SO_4)_{0.05})Cl_{1.25}$ In a glove box having an Ar atmosphere, $Li_2S$ as a lithium precursor, $P_2S_5$ as a phosphorous (P) precursor, a LiCl as a chlorine (Cl) precursor, a $Cu_2S$ as a copper (Cu) precursor, and a $Li_2SO_4$ as a $SO_4$ precursor were mixed at a stoichiometric ratio to obtain the desired composition of $(Li_{5.69}Cu_{0.06})P(S_{4.70}(SO_4)_{0.05})Cl_{1.25}$, the resultant was pulverized and mixed in a planetary ball mill including a zirconia (YSZ) ball in an Ar atmosphere at 100 rpm for 1 hour and then pulverized and mixed at 800 rpm for 30 minutes to obtain a mixture. The obtained mixture was pressed by a uniaxial pressure to prepare a pellet having a thickness of about 10 mm and a diameter of about 13 mm. The pellet thus obtained was coated with a gold film and placed into a carbon furnace, and the carbon furnace was vacuum-sealed by using a quartz glass tube. A temperature of the vacuum-sealed pellet was increased from room temperature to 500° C. using an electric furnace at a rate of 1.0° C./minute (° C./min), heat-treated at 500° C. for 12 hours, and then cooled to room temperature at a rate of 1.0° C./min to prepare a solid ion conductor compound.

A composition of the solid ion conductor compound thus prepared was $(Li_{5.69}Cu_{0.06})P(S_{4.70}(SO_4)_{0.05})Cl_{1.25}$ (where a ratio of the substituted cation (Cu) was 0.01, and a ratio of the substituted anion ($SO_4$) was 0.01).

Example 2: Preparation of $((Li_{5.69+b}Cu_{0.06})P(S_{4.75+b-a}(SO_4)_a)(Cl_{1.25-b}(SO_4)_b)$, $(SO_4)_{a+b}=(SO_4)_{0.15}$, (where $0.05 < a < 0.15$, $0 < b < 0.15$, and $a+b=0.15$)

A solid ion conductor compound was prepared in the same manner as in Example 1, except that a stoichiometric ratio of the starting materials was changed to satisfy a composition of $(Li_{5.69}Cu_{0.06})P(S_{4.60}(SO_4)_{0.15})Cl_{1.25}$.

As shown in FIG. 1B, a solid ion conductor compound of the following composition was obtained due to re-precipitation of some Cl of the composition in the form of LiCl.

A composition of the solid ion conductor compound obtained was $(Li_{5.69+b}Cu_{0.06})P(S_{4.75+b-a}(SO_4)_a)(Cl_{1.25-b}(SO_4)_b)$, $(SO_4)_{a+b}=(SO_4)_{0.15}$, ($0.05 < a < 0.15$, $0 < b < 0.15$, $a+b=0.15$).

Example 3: Preparation of $(Li_{5.72}Cu_{0.03})P(S_{4.725}(SO_4)_{0.025})Cl_{1.25}$ A solid ion conductor compound was prepared in the same manner as in Example 1, except that a stoichiometric ratio of the starting materials was changed to satisfy the desired composition of $(Li_{5.72}Cu_{0.03})P(S_{4.725}(SO_4)_{0.025})Cl_{1.25}$.

A composition of the solid ion conductor compound was $(Li_{5.72}Cu_{0.03})PS_{4.725}(SO_4)_{0.0225}Cl_{1.25}$ ((where a ratio of the substituted cation (Cu) was 0.005, and a ratio of the substituted anion ($SO_4$) was 0.005).

Example 4: Preparation of $(Li_{5.72}Na_{0.03})P(S_{4.725}(SO_4)_{0.025})Cl_{1.25}$ A solid ion conductor compound was prepared in the same manner as in Example 1, except that a $Na_2S$ as a sodium (Na) precursor was used instead of the copper precursor, and a stoichiometric ratio of the starting materials was changed to satisfy the desired composition of $(Li_{5.72}Na_{0.03})P(S_{4.725}(SO_4)_{0.025})Cl_{1.25}$.

A composition of the solid ion conductor compound was $(Li_{5.72}Na_{0.03})P(S_{4.725}(O_4)_{0.025})Cl_{1.25}$ ((where a ratio of the substituted cation (Na) was 0.005, and a ratio of the substituted anion ($SO_4$) was 0.005).

Example 5: Preparation of $Li_{5.75}P(S_{4.725}(SO_4)_{0.025})Cl_{1.25}$

A solid ion conductor compound was prepared in the same manner as in Example 1, except that a stoichiometric ratio of the starting materials was changed to satisfy the desired composition of $Li_{5.75}P(S_{4.725}(SO_4)_{0.025})Cl_{1.25}$ without adding $Cu_2S$.

A composition of the solid ion conductor compound was $Li_{5.75}P(S_{4.725}(SO_4)_{0.025})Cl_{1.25}$ (where a ratio of the substituted anion ($SO_4$) was 0.005).

Comparative Example 1: Preparation of $Li_{5.75}PS_{4.75}Cl_{1.25}$

A solid ion conductor compound was prepared in the same manner as in Example 1, except that a stoichiometric ratio of the starting materials was changed to satisfy the desired composition of $Li_{5.75}PS_{4.75}Cl_{1.25}$ without adding $Cu_2S$ and $Li_2SO_4$.

A composition of the solid ion conductor compound was $L_{5.75}PS_{4.75}Cl_{1.25}$.

Comparative Example 2: Preparation of $L_{5.75}P(S_{4.72}O_{0.03})Cl_{1.25}$ A solid ion conductor compound was prepared in the same manner as in Example 1, except that $Li_2O$ was added and a stoichiometric ratio of the starting materials was changed to satisfy the desired composition of $Li_{5.75}P(S_{4.72}O_{0.03})Cl_{1.25}$ without adding $Cu_2S$ and $Li_2SO_4$.

A composition of the solid ion conductor compound was $Li_{5.75}P(S_{4.72}O_{0.03})Cl_{1.25}$ (where a ratio of the substituted anion (O) was 0.006).

Reference Example 1: Preparation of $(Li_{5.69}Cu_{0.06})PS_{4.75}Cl_{1.25}$ A solid ion conductor compound was prepared in the same manner as in Example 1, except that a stoichiometric ratio of the starting materials was changed to satisfy the desired composition of $(L_{5.69}Cu_{0.06})PS_{4.75}Cl_{1.25}$ without adding $Li_2SO_4$.

A composition of the solid ion conductor compound was $(Li_{5.69}Cu_{0.06})PS_{4.75}Cl_{1.25}$ (where a ratio of the substituted cation (Cu) was 0.01).

Reference Example 2: Preparation of $(Li_{5.72}Cu_{0.03})PS_{4.75}Cl_{1.25}$ A solid ion conductor compound was prepared in the same manner as in Example 1, except that a stoichiometric ratio of the starting materials was changed to satisfy the desired composition of $(Li_{5.72}Cu_{0.03})PS_{4.75}Cl_{1.25}$ without adding $Li_2SO_4$.

A composition of the solid ion conductor compound was $(Li_{5.72}Cu_{0.03})PS_{4.75}Cl_{1.25}$ (where a ratio of the substituted cation (Cu) was 0.005).

Example 6: Preparation of all-Solid Secondary Battery

Preparation of Cathode Layer $LiNi_{0.8}Co_{0.05}Al_{0.05}O_2$ (NCA) was prepared as a cathode active material. The sulfide-based solid electrolyte powder obtained in Example 1 was prepared as a solid electrolyte. Carbon nanofibers (CNFs) were prepared as a conducting agent. These materials were mixed at a weight ratio of 60:35:5=cathode active material:solid electrolyte:conducting agent to prepare a cathode mixture.

Preparation of Solid Electrolyte Powder

The sulfide-based solid ion conductor compound prepared in Example 1 was pulverized by using an agate mortar to prepare a solid electrolyte powder.

Preparation of Anode Layer

A metal lithium foil having a thickness of 30 μm was prepared as an anode.

Preparation of all-Solid Secondary Battery

The anode layer, 150 mg of the solid electrolyte powder, and 15 mg of the cathode mixture were sequentially stacked on a SUS lower electrode in this stated order, and a SUS upper electrode was disposed on the cathode mixture to prepare a stack. Then, the stack was pressed under a pressure of 4 ton/cm² for 2 minutes. Subsequently, the pressed stack was pressed at a torque of 4 N·m by using a torque wrench to prepare an all-solid secondary battery.

Examples 7 to 10

All-solid secondary batteries were prepared in the same manner as in Example 6, except that the solid electrolyte powders prepared in Examples 2 to 5 were used, each respectively, instead of the solid electrolyte powder prepared in Example 1.

Comparative Example 3

An all-solid secondary battery was prepared in the same manner as in Example 6, except that the solid electrolyte powder prepared in Comparative Example 1 was used instead of the solid electrolyte powder prepared in Example 1.

Evaluation Example 1: X-Ray Diffraction Test

The solid ion conductor compounds prepared in Examples 1 to 5 and Reference Examples 1 and 2 were pulverized by using an agate mortar to prepare powders, a powder XRD of each of the powders was measured and a part of the results are shown in FIGS. 1A to 1C. CuKα radiation was used in the XRD measurement. It was confirmed that the solid ion conductor compounds of Examples 1 to 5 and Reference Example 1 belonged to a F-43m space group, had a structure that belongs to a cubic crystal system, and was an argyrodite-type sulfide having an argyrodite-type crystal structure. FIG. 1B is an enlarged view of a part in FIG. 1A, and FIG. 1C is an enlarged view of a part in FIG. 1B and a view in which positions of peaks of the solid ion conductor compounds of Example 2 and Reference Example 1 are compared.

In FIGS. 1A and 1B, the solid ion conductor compound of Example 2 had a peak that corresponds to a LiCl phase near a diffraction angle 2θ of 35°. Also, peaks caused by impurities including $SO_4$ were not observed.

Thus, the peak caused by a LiCl phase was deemed as a peak that appeared by some of Cl re-precipitated in the form of LiCl as $SO_4$ is substituted to a S(4c) site and/or a Cl(4a) site in the solid ion conductor compound of Example 2, except a P(4b) site and a S(16c) site of the tetrahedral $PS_4$ group in the argyrodite-type crystal structure. Therefore, it was confirmed that a S(4c) site and/or a Cl(4a) site in the solid ion conductor compound of Example 2 were substituted with $SO_4$. The Cl(4a) site is a site in which S existed before being substituted with Cl.

As shown in FIG. 1C, the solid ion conductor compound of Example 2 had a first peak at a diffraction angle of 30.14°2θ and a second peak at a diffraction angle of 31.52°2θ.

Also, as shown in FIG. 1C, the solid ion conductor compound of Reference Example 1 (having the same composition with the solid ion conductor compound of Example 2, except that $SO_4$ is substituted with S) had a third peak at a diffraction angle of 30.18°2θ and a fourth peak at a diffraction angle of 31.56°2θ. Thus, it was confirmed that the first peak and the second peak of the solid ion conductor compound of Example 2 were downshifted 0.04° toward the lower angle compared to the third peak and the fourth peak of the solid conductor compound of Reference Example 1.

The downshift was deemed as due to an increase in distance between adjacent planes (e.g. d-spacing) of the crystal lattice since some S in the solid ion conductor compound of Example 2 are substituted with $SO_4$ having an ion diameter greater than that of S.

Evaluation Example 2: Ion Conductivity Measurement

The solid ion conductor compounds prepared in Examples 1 to 5 and Comparative Examples 1 and 2 were pulverized by using an agate mortar to prepare powders, and 200 mg each of the powders were pressed under a pressure of 4 ton/cm² for 2 minutes to prepare a pellet sample having a thickness of about 100 μm and a diameter of about 13 mm. An indium (In) electrode having a thickness of about 50 μm and a diameter of about 13 mm was disposed on each of both surfaces of the pellet sample to prepare a symmetry cell. The preparation of the symmetry cell was performed in a glove box with an Ar atmosphere.

An impedance of the pellet was measured by using a 2-probe method by using an impedance analyzer (Material Mates 7260 impedance analyzer) on the sample having the indium electrode on both surfaces thereof. A frequency range was in a range of about 0.1 Hz to about 1 MHz, and an amplitude voltage was about 10 mV. The measurement was performed in an Ar atmosphere at about 25° C. An ion conductivity was calculated by obtaining a resistance from an arc of the Nyquist plot with respect to the result of impedance measurement and considering an area and a thickness of the sample.

The results are shown in Table 1.

TABLE 1

| | Room temperature (25° C.) ion conductivity [mS/cm] |
|---|---|
| Example 1 | 4.2 |
| Example 2 | 2.3 |
| Example 3 | 2.8 |
| Example 4 | 3.2 |
| Example 5 | 3.7 |
| Comparative Example 1 | 2.2 |
| Comparative Example 2 | 2.8 |

As shown in Table 1, the solid ion conductor compounds of Examples 1 to 5 had high ion conductivities of about 2.3 mS/cm or higher at room temperature.

The solid ion conductor compounds of Examples 1 to 5 had improved ion conductivities compared to that of the solid ion conductor compound of Comparative Example 1.

The solid ion conductor compound of Example 5 had an improved ion conductivity than that of the solid ion conductor compound of Comparative Example 2 which had a composition corresponding to that of the solid ion conductor compound of Example 5 and to which O was substituted instead of $SO_4$. It was deemed that the improved ion conductivity was provided due to distortion of a crystalline structure as sulfate ions ($SO_4^{2-}$, ionic radius of 0.147 nm) having an increased ion radius than that of oxygen ions ($O^{2-}$, ionic radius of 0.140 nm) were substituted in the solid ion conductor compound of Example 5.

An ion conductivity of the solid ion conductor compound of Example 2 is lower than that of the solid ion conductor of Comparative Example 2, but this reduced ion conductivity is deemed as due to a Cu additionally substituted in addition to $SO_4$. For example, the solid ion conductor compounds of Examples 1 and 3 having a low content of Cu and $SO_4$ had an ion conductivity equal to or higher than that of the solid ion conductor compound of Comparative Example 2.

Evaluation Example 3: Atmospheric Stability Evaluation

The solid ion conductor compound prepared in Examples 1 and 2 and Comparative Example 1 were pulverized by using an agate mortar to prepare powders, the powders were stored under a dry room of the air atmosphere having a dew point lower than −60° C. for 10 days. The powders were removed from the dry room, a change in the ion conductivity of each of the powders were measured. The change in the ion conductivity was calculated by using an ion conductivity retention of Equation 1. The results of the measurement are shown in Table 2. An initial ion conductivity is an ion conductivity of the powder before being stored in the dry room. The ion conductivity measurement was performed in the same manner as in Evaluation Example 2.

Ion conductivity retention=[Ion conductivity of the solid ion conductor compound after 10 days/ initial ion conductivity of the solid ion conductor compound]×100%   Equation 1

TABLE 2

| | Ion conductivity retention rate [%] |
|---|---|
| Example 1 | 81.2 |
| Example 2 | 83.2 |
| Comparative Example 1 | 65.6 |

As shown in Table 2, the solid ion conductor compounds of Examples 1 and 2 had improved ion conductivity retention compared to that of the solid ion conductor compound of Comparative Example 1.

The solid ion conductor compounds of Examples 1 and 2 had improved atmospheric stability or oxidative stability compared to those of the solid ion conductor compound of Comparative Example 1.

Evaluation Example 4: Charge/Discharge Test and Interfacial Stability Evaluation Charge/discharge characteristics of the all-solid secondary batteries prepared in Examples 6 and 7 and Comparative Example 3 were evaluated by the following charge/discharge test. The charge/discharge test was performed by placing the all-solid secondary battery in a chamber of 45° C.

In the 1st cycle, the battery was charged with a constant current of 0.1 C until the battery voltage reached 4.25 V and then charged at a constant voltage of 4.25 V until a current reached 0.05 C. Then, the battery was discharged with a constant current of 0.1 C until the battery voltage reached 2.5 V. A discharge capacity of the 1st cycle was used as a standard capacity.

A C rate means a current which will discharge a battery in one hour, e.g., a C rate for a battery having a discharge capacity of 1.6 ampere-hours would be 1.6 amperes.

In the 2nd cycle, the battery was charged with a constant current of 0.1 C until the battery voltage reached 4.25 V and then charged at a constant voltage of 4.25 V for 50 hours. Then, the battery was discharged with a constant current of 0.1 C until the battery voltage reached 2.5 V. The constant voltage charging step corresponds to a step of storing at high temperature.

A discharge capacity of the 2nd cycle was used as a retention capacity.

In the 3rd cycle, the battery was charged with a constant current of 0.1 C until the battery voltage reached 4.25 V and then charged at a constant voltage of 4.25 V until a current reached 0.05 C. Then, the battery was discharged with a constant current of 0.1 C until the battery voltage reached 2.5 V.

A discharge capacity of the 3rd cycle was used as a recovery capacity. 10 minutes of retention time was set after every charging/discharging cycle.

Capacity recovery and capacity retention after storing at a high temperature of the all-solid secondary batteries prepared in Examples 6 and 7 and Comparative Example 3 are shown in Table 3.

The capacity retention after storing at a high temperature and the capacity recovery are defined as shown in Equations 2 and 3.

Capacity retention (%)=[Retention capacity/standard capacity]×100%     Equation 2

Capacity recovery (%)=[Recovery capacity/standard capacity]×100%     Equation 3

TABLE 3

| | Capacity Retention [%] | Capacity Recovery [%] |
|---|---|---|
| Example 6 | 91.4 | 80.7 |
| Example 7 | 88.8 | 73.1 |
| Comparative Example 3 | 86.9 | 69.7 |

As shown in Table 3, the all-solid secondary batteries of Examples 6 and 7 had improved capacity retention after storing the battery in a charged state at a high temperature for a long period of time and improved capacity recovery compared to those of the all-solid secondary battery of Comparative Example 3.

The all-solid secondary batteries of Examples 6 and 7 had improved stability (e.g., oxidation-resistance) verses lithium metal compared to that of the all-solid secondary battery of Comparative Example 3.

As described above, according to one or more embodiments, an electrochemical cell having improved stability and cycle characteristics may be provided by including a solid ion conductor compound having improved lithium ion conductivity and stability with respect to lithium metal.

It should be understood that embodiments described herein should be considered in a descriptive sense only and not for purposes of limitation. Descriptions of features or aspects within each embodiment should be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A compound represented by Formula 1 and having an argyrodite-type crystal structure:

$$Li_xM1_vPS_yM2_wM3_z \quad \text{Formula 1}$$

wherein, in Formula 1,
M1 comprises Ag, Cu, Fe, Zn, Cr, Sn, V, or a combination thereof,
M2 is $SO_n$,
M3 is at least one element of Group 17 of the periodic table, and
$4 \leq x \leq 8$, $0 < v < 1$, $3 \leq y \leq 7$, $0 < w < 2$, $0 \leq z \leq 2$, and $1.5 \leq n \leq 5$.

2. The compound of claim 1, wherein $0 \leq v/(x+v) < 0.2$ and $0 < w/(y+w) < 0.2$.

3. The compound of claim 1, wherein the $SO_n$ is $S_4O_6$, $S_3O_6$, $S_2O_3$, $S_2O_4$, $S_2O_5$, $S_2O_6$, $S_2O_7$, $S_2O_8$, $SO_4$, $SO_5$, or a combination thereof.

4. The compound of claim 1, wherein $0 \leq v/(x+v) < 0.08$ and $0 < w/(y+w) < 0.08$.

5. The compound of claim 1, wherein M1 comprises Mg, Ag, Cu, or a combination thereof.

6. The compound of claim 1, wherein M3 comprises F, Cl, Br, I, or a combination thereof.

7. The compound of claim 1, wherein the compound represented by Formula 1 is represented by Formula 2:

$$Li_{7-m-v-z}M1_vPS_{6-w-2}M2_wM3_z \quad \text{Formula 2}$$

wherein, in Formula 2,
M1 comprises Ag, Cu, Fe, Zn, Cr, Sn, V, or a combination thereof,
M2 is $SO_n$,
M3 is at least one element of Group 17 of the periodic table, and
$0 < v < 1$, $0 < w < 2$, $0 \leq z \leq 2$, $1.5 \leq n \leq 5$, and $1 \leq m \leq 2$.

8. The compound of claim 1, wherein the compound represented by Formula 1 is represented by one of Formula 3 or Formula 4:

$$(Li_{1-d}M1_d)_aP(S_{1-e}M2_e)_bM3_c \quad \text{Formula 3}$$

$$(Li_{1-d}M1_d)_aLi_{fc}P(S_{1+fc-e}M2_e)_b(M3_{1-f}M2_f)_c \quad \text{Formula 4}$$

wherein, in Formulae 3 and 4,
M1 is Ag, Cu, Fe, Zn, Cr, Sn, V, or a combination thereof,
M2 is $SO_4$, M3 is at least one element of Group 17 of the periodic table;

$5 \leq a \leq 7$, $45 \leq b \leq 6$, and $0 \leq c \leq 2$, and $0 < d \leq 0.08$, $0 < e \leq 0.08$, $0 < f \leq 0.08$, and $0 < e+f \leq 0.08$.

9. The compound of claim 1, wherein the compound represented by Formula 1 is represented by Formula 5 or Formula 6,

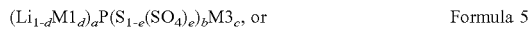  Formula 5

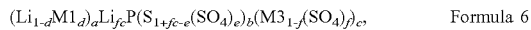  Formula 6 wherein, in Formulae 5 and 6,

M1 is Ag, Cu, or a combination thereof;

M3 is at least one element of Group 17 of the periodic table;

$5 \leq a \leq 7$, $45 \leq b \leq 6$, and $0 \leq c \leq 2$, and $0 < d < 0.08$, $0 < < < 0.08$, $0 < f < 0.08$, and $0 < e+f < 0.08$.

10. A compound represented by Formula 5d, Formula 5e, Formula 6a, Formula 6b, Formula 6c, Formula 6d, or Formula 6e, and having an argyrodite-type crystal structure:

  Formula 5d

  Formula 5e

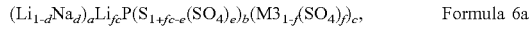  Formula 6a

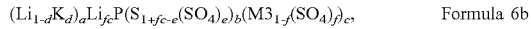  Formula 6b

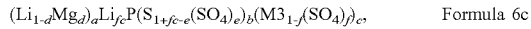  Formula 6c

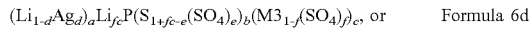  Formula 6d

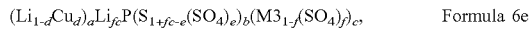  Formula 6e wherein, in Formula 5c, Formula 5d, Formula 5e, Formula 6a, Formula 6b, Formula 6c, Formula 6d, and Formula 6e, each M3 is independently selected and is an element of Group 17 of the periodic table, a, b, and c are each independently selected, and $5 \leq a \leq 7$, $4 \leq b \leq 6$, and $0 \leq c \leq 2$, and d, e, and f are each independently selected and $0 < d < 0.06$, $0 \leq e \leq 0.06$, $0 < f \leq 0.06$, and $0 < e+f \leq 0.06$.

11. The compound of claim 10, wherein the compound represented by Formula 1 is represented by:

$(Li_{1-d}Cu_d)_aP(S_{1-e}(SO_4)_e)_bF_c$, $(Li_{1-d}Cu_d)_aP(S_{1-e}(SO_4)_e)_bCl_c$, $(Li_{1-d}Cu_d)_aP(S_{1-e}(SO_4)_e)_bBr_c$, $(Li_{1-d}Cu_d)_aP(S_{1-e}(SO_4)_e)_bI_c$, $(Li_{1-d}Cu_d)_aLi_{fc}P(S_{1+fc-e}(SO_4)_e)_b(F_{1-f}(SO_4)_f)_c$, $(Li_{1-d}Cu_d)_aLi_{fc}P(S_{1+fc-e}(SO_4)_e)_b(Cl_{1-f}(SO_4)_f)_c$, $(Li_{1-d}Cu_d)_aLi_{fc}P(S_{1+fc-e}(SO_4)_e)_b(Br_{1-f}(SO_4)_f)_c$, $(Li_{1-d}Cu_d)_aLi_{fc}P(S_{1+fc-e}(SO_4)_e)_b(I_{1-f}(SO_4)_f)_c$, $(Li_{1-d}Mg_d)_aLi_{fc}P(S_{1+fc-e}(SO_4)_e)_b(F_{1-f}(SO_4)_f)_c$, $(Li_{1-d}Mg_d)_a Li_{fc}P(S_{1+fc-e}(SO_4)_e)_b(Cl_{1-f}(SO_4)_f)_c$, $(Li_{1-d}Mg_d)_a Li_{fc}P(S_{1+fc-e}(SO_4)_e)_b(Br_{1-f}(SO_4)_f)_c$, $(Li_{1-d}Mg_d)_aLi_{fc}P(S_{1+fc-e}(SO_4)_e)_b(I_{1-f}(SO_4)_f)_c$, $(Li_{1-d}Ag_d)_aP(S_{1-e}(SO_4)_e)_bF_c$, $(Li_{1-d}Ag_d)_aP(S_{1-e}(SO_4)_e)_bCl_c$, $(Li_{1-d}Ag_d)_aP(S_{1-e}(SO_4)_e)_bBr_c$, $(Li_{1-d}Ag_d)_aP(S_{1-e}(SO_4)_e)_bI_c$, $(Li_{1-d}Ag_d)_aLi_{fc}P(S_{1+fc-e}(SO_4)_e)_b(F_{1-f}(SO_4)_f)_c$, $(Li_{1-d}Ag_d)_a Li_{fc}P(S_{1+fc-e}(SO_4)_e)_b(Cl_{1-f}(SO_4)_f)_c$, $(Li_{1-d}Ag_d)_aLi_{fc}P(S_{1+fc-e}(SO_4)_e)_b(Br_{1-f}(SO_4)_f)_c$, or $(Li_{1-d}Ag_d)_aLi_{fc}P(S_{1+fc-e}(SO_4)_e)_b(I_{1-f}(SO_4)_f)_c$, wherein, each a, b, c, d, e, and f is independently selected and $5 \leq a \leq 7$, $4 \leq b \leq 6$, $0 \leq c \leq 2$, $0 < d \leq 0.06$, $0 < e < 0.06$, $0 < f \leq 0.06$, and $0 < e+f < 0.06$.

12. A compound represented by a formula of:

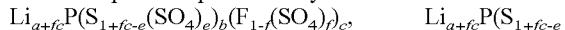

wherein, in the formulae, $5 \leq a \leq 7$, $4 \leq b \leq 6$, and $0 < c \leq 2$; and $0 < e < 0.06$, $0 < f < 0.06$, and $0 < e+f < 0.06$.

13. The compound of claim 1, wherein the compound represented by Formula 1 has an ion conductivity of about 1 milliSiemens per centimeter or greater at a temperature of about 25° C.

14. The compound of claim 1, wherein the compound represented by Formula 1 has an ion conductivity retention of about 70% or greater, when analyzed after 10 days in an air atmosphere having a dew point of less than −60° C., wherein the ion conductivity retention is defined as shown in Equation 1:

Ion conductivity retention=[Ion conductivity of the compound after 10 days/initial ion conductivity of the compound]×100%.   Equation 1

15. The compound of claim 1, wherein the compound represented by Formula 1 belongs to a cubic crystal system.

16. The compound of claim 1, wherein the compound represented by Formula 1 belongs to a F-43m space group.

17. The compound of claim 1, wherein the compound represented by Formula 1 has a first peak at a diffraction angle of 30.1°2θ+0.5°2θ and a second peak at a diffraction angle of 31.5°2θ+0.5°2θ, when analyzed by X-ray diffraction using a CuKα radiation, and a compound having the same composition with that of the compound represented by Formula 1, except that M2 is S, has a third peak at a diffraction angle of 30.1°2θ+0.5°2θ and a fourth peak at a diffraction angle of 31.5°2θ+0.5°2θ when analyzed by X-ray diffraction using CuKα radiation, and wherein the position of the first peak is at least 0.01°2θ less than the position of the third peak, and the position of the second peak is at least 0.01°2θ less than a position of the fourth peak.

18. The compound of claim 1, wherein the compound represented by Formula 1 further has a peak corresponding to LiM3 at a diffraction angle of 35.0°2θ=1.0°2θ in when analyzed by X-ray diffraction using CuKα radiation.

19. A protected cathode active material comprising:

a lithium transition metal oxide, a transition metal sulfide, or a combination thereof; and the compound of claim 1 on a surface of the lithium transition metal oxide, the transition metal sulfide, or the lithium transition metal sulfide.

20. A solid electrolyte comprising the compound of claim 1.

21. An electrochemical cell comprising:

a cathode layer comprising a cathode active material layer;

an anode layer comprising an anode active material layer; and an electrolyte layer disposed between the cathode layer and the anode layer, wherein at least one of the cathode active material layer and the electrolyte layer comprises the compound of claim 1.

22. The electrochemical cell of claim 21, wherein the electrochemical cell is an all-solid secondary battery.

23. The electrochemical cell of claim 21, wherein the anode active material layer comprises an anode active material and a binder, wherein the anode active material comprises amorphous carbon and Au, Pt, Pd, Si, Ag, Al, Bi, Sn, Zn, or a combination thereof.

24. The electrochemical cell of claim 21, wherein the anode layer further comprises an anode current collector, and a metal layer is further comprised between the anode current collector and the anode active material layer, wherein the metal layer comprises lithium or a lithium alloy.

25. A method of preparing the compound of claim 1, the method comprising:
   contacting a compound comprising
      lithium,
      a compound comprising a metal element of Ag, Cu, Fe, Zn, Cr, Sn, V, or a combination thereof,
   a compound comprising P,
   a compound comprising $SO_n$ wherein $1.5 \leq n \leq 5$, and
   optionally a compound comprising a Group 17 element of the periodic table to prepare a mixture; and
   heat-treating the mixture in an inert atmosphere to prepare the compound of claim 1.

26. The method of claim 25, wherein the heat-treating comprises heat-treating at a temperature of about 400° C. to about 600° C. for about 1 hour to about 36 hours.

* * * * *